(12) United States Patent
Schuster et al.

(10) Patent No.: US 6,822,957 B1
(45) Date of Patent: Nov. 23, 2004

(54) DISTRIBUTED NETWORK ADDRESS TRANSLATION FOR A NETWORK TELEPHONY SYSTEM

(75) Inventors: Guido M. Schuster, Zurich (CH); Michael S. Borella, Naperville, IL (US); David A. Grabelsky, Skokie, IL (US); Ikhlaq S. Sidhu, Vernon Hills, IL (US)

(73) Assignee: 3Com Corporation, Marlborough, MA (US)

( * ) Notice: Subject to any disclaimer, the term of this patent is extended or adjusted under 35 U.S.C. 154(b) by 827 days.

(21) Appl. No.: 09/707,708

(22) Filed: Nov. 7, 2000

Related U.S. Application Data

(63) Continuation-in-part of application No. 09/035,600, filed on Mar. 5, 1998, now Pat. No. 6,353,614.

(51) Int. Cl.[7] .......................... H04L 12/28; H04L 12/52
(52) U.S. Cl. ...................... 370/389; 370/401; 370/474; 370/475; 709/238
(58) Field of Search .................................. 370/351, 352, 370/353, 354, 355, 356, 389, 392, 474, 475, 476, 400, 401; 709/217, 218, 219, 238, 245, 223; 713/160, 161

(56) References Cited

U.S. PATENT DOCUMENTS

| | | | |
|---|---|---|---|
| 4,313,035 A | 1/1982 | Jordan et al. | |
| 4,953,198 A | 8/1990 | Daly et al. | |
| 5,159,592 A | 10/1992 | Perkins | |
| 5,227,778 A | 7/1993 | Vacon et al. | |
| 5,428,663 A | 6/1995 | Grimes et al. | |
| 5,448,623 A | 9/1995 | Wiedeman et al. | |
| 5,497,339 A | 3/1996 | Bernard | |
| 5,526,489 A | 6/1996 | Nilakantan et al. | |

(List continued on next page.)

FOREIGN PATENT DOCUMENTS

| | | |
|---|---|---|
| DE | 198 13 179 A 1 | 9/1999 |
| EP | 0 578 374 A1 | 6/1993 |
| EP | 0 704 788 A2 | 4/1996 |
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |
| WO | WO95/34985 | 12/1995 |
| WO | WO 97/31492 | 8/1997 |

(List continued on next page.)

OTHER PUBLICATIONS

"Understanding Packet Voice Protocols"; The International Engineering Consortium; http://www.iec.org.

(List continued on next page.)

*Primary Examiner*—Bob A Phunkulh
(74) *Attorney, Agent, or Firm*—McDonnell Boehnen Hulbert & Berghoff LLP

(57) ABSTRACT

System and method for distributed network address translation in a network telephony system. A first network phone with a first protocol, requests at least one locally unique port from a first network device. The first network phone and the first network device are located on a first network. The first network phone receives, with the first protocol, the at least one locally unique port from the first network device. At least one default or ephemeral port on the first network phone is replaced with the at least one locally unique port. A combination network address is created for the first network phone with the at least one locally unique port and a common external network address, thereby identifying the first network phone for communications with a second network device located on a second network. The second network device may, for example, be a second network phone. In a preferred embodiment, the first protocol is a Port Allocation Protocol, such as the Realm Specific Internet Protocol.

41 Claims, 10 Drawing Sheets

U.S. PATENT DOCUMENTS

| | | |
|---|---|---|
| 5,550,984 A | 8/1996 | Gelb |
| 5,557,658 A | 9/1996 | Gregorek et al. |
| 5,563,937 A | 10/1996 | Bruno et al. |
| 5,606,594 A | 2/1997 | Register et al. |
| 5,636,216 A | 6/1997 | Fox et al. |
| 5,646,945 A | 7/1997 | Bergler |
| 5,708,655 A | 1/1998 | Toth et al. |
| 5,727,057 A | 3/1998 | Emery et al. |
| 5,732,074 A | 3/1998 | Spaur et al. |
| 5,732,216 A | 3/1998 | Logan et al. |
| 5,742,905 A | 4/1998 | Pepe et al. |
| 5,793,763 A | 8/1998 | Mayes et al. |
| 5,812,819 A | 9/1998 | Rodwin et al. |
| 5,838,665 A | 11/1998 | Kahn et al. |
| 5,850,433 A | 12/1998 | Rondeau |
| 5,867,660 A | 2/1999 | Schmidt et al. |
| 5,872,847 A | 2/1999 | Boyle et al. |
| 5,875,405 A | 2/1999 | Honda |
| 5,894,473 A | 4/1999 | Dent |
| 5,894,595 A | 4/1999 | Foladare et al. |
| 5,915,008 A | 6/1999 | Dulman |
| 5,918,172 A | 6/1999 | Saunders et al. |
| 5,930,700 A | 7/1999 | Pepper et al. |
| 5,933,778 A | 8/1999 | Buhrmann et al. |
| 5,938,757 A | 8/1999 | Bertsch |
| 5,960,340 A | 9/1999 | Fuentes |
| 5,970,059 A | 10/1999 | Ahopelto et al. |
| 5,991,394 A | 11/1999 | Dezonno et al. |
| 6,006,272 A | 12/1999 | Aravamudan et al. |
| 6,011,782 A | 1/2000 | DeSimone et al. |
| 6,031,904 A | 2/2000 | An et al. |
| 6,055,236 A | 4/2000 | Nessett et al. |
| 6,075,992 A | 6/2000 | Moon et al. |
| 6,157,950 A * | 12/2000 | Krishnan ............... 709/223 |
| 6,161,134 A | 12/2000 | Wang et al. |
| 6,163,598 A | 12/2000 | Moore |
| 6,175,860 B1 | 1/2001 | Gaucher |
| 6,216,158 B1 | 4/2001 | Luo et al. |
| 6,240,097 B1 | 5/2001 | Weslock et al. |
| 6,243,379 B1 * | 6/2001 | Veerina et al. ............ 370/389 |
| 6,301,609 B1 | 10/2001 | Aravamudan et al. |
| 6,308,201 B1 | 10/2001 | Pivowar et al. |
| 6,404,766 B1 * | 6/2002 | Kitai et al. .............. 370/392 |
| 6,411,965 B2 | 6/2002 | Klug |
| 6,496,477 B1 | 12/2002 | Perkins et al. |
| 2001/0030950 A1 | 10/2001 | Chen et al. |

FOREIGN PATENT DOCUMENTS

| | | |
|---|---|---|
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 99/45687 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/50578 A2 | 7/2000 |

OTHER PUBLICATIONS

U.S. patent application Ser. No. 09/451,388, Schuster et al., filed Nov. 30, 1999.

U.S. patent application Ser. No. 09/406,231, Schuster et al., filed Sep. 27, 1999.

U.S. patent application Ser. No. 09/515,365, Schuster et al., filed Feb. 29, 2000.

U.S. patent application Ser. No. 09/406,320, Schuster et al., filed Sep. 27, 1999.

U.S. patent application Ser. No. 09/515,797, Schuster et al., filed Feb. 29, 2000.

U.S. patent application Ser. No. 09/515,364, Schuster et al., filed Feb. 29, 2000.

U.S. patent application Ser. No. 09/405,283, Schuster et al., filed Sep. 27, 1999.

U.S. patent application Ser. No. 09/515,798, Schuster et al., filed Feb. 29, 2000.

U.S. patent application Ser. No. 09/584,924, Schuster et al., filed May 31, 2000.

U.S. patent application Ser. No. 09/515,969, Schuster et al., filed Feb. 29, 2000.

U.S. patent application Ser. No. 09/406,322, Schuster et al., filed Sep. 27, 1999.

U.S. patent application Ser. No. 09/406,152, Schuster et al., filed Sep. 27, 1999.

U.S. patent application Ser. No. 09/405,981, Schuster et al., filed Sep. 27, 1999.

U.S. patent application Ser. No. 09/406,128, Schuster et al., filed Sep. 27, 1999.

U.S. patent application Ser. No. 09/515,387, Schuster et al., filed Feb. 29, 2000.

U.S. patent application Ser. No. 09/515,970, Schuster et al., filed Feb. 29, 2000.

U.S. patent application Ser. No. 09/515,796, Schuster et al., filed Feb. 29, 2000.

U.S. patent application Ser. No. 09/406,151, Schuster et al., filed Sep. 27, 1999.

U.S. patent application Ser. No. 09/406,298, Schuster et al., filed Sep. 27, 1999.

U.S. patent application Ser. No. 09/406,066, Schuster et al., filed Sep. 27, 1999.

U.S. patent application Ser. No. 09/515,795, Schuster et al., filed Feb. 29, 2000.

U.S. patent application Ser. No. 09/516,269, Schuster et al., filed Feb. 29, 2000.

U.S. patent application Ser. No. 09/515,366, Schuster et al., filed Feb. 29, 2000.

U.S. patent application Ser. No. 09/470,879, Schuster et al., filed Dec. 22, 1999.

U.S. patent application Ser. No. 09/677,077, Schuster et al., filed Sep. 29, 2000.

U.S. patent application Ser. No. 09/584,927, Schuster et al., filed May 31, 2000.

U.S. patent application Ser. No. 09/726,993, Schuster et al., filed Nov. 30, 2000.

U.S. patent application Ser. No. 09/728,833, Schuster et al., filed Nov. 30, 2000.

Terry, Douglas B. et al. *Managing Stored Voice In the Etherphone System,* Operating Systems Review (SIGOPS), US, ACM Head Quarter, New York, NY. vol. 21, No. % (Nov. 8, 1987), pps. 103–104, XP 000005196.

Zellweger, Polle T. et al. *An Overview of the Etherphone System and Its Applications,* Xerox Palo Alto Research Center (Mar. 1988), pps. 160–168, XP 000617541.

Terry, Douglas B. et al. *Managing Stored Voice In the Etherphone System,* Xerox Palo Alto Research Center vol. 1, (Feb. 1998), pps. 3–27, XP 000032477.

Hansson, Allan et al., *Phone Doubler—A Step Towards Integrated Internet and Telephone Communities*, Ericsson Review, No. 4, 1997, pps. 142–152.

International Search Report for PCT Application Serial No. PCT/US00/26618, Dated Feb. 19, 2001.

Pepper, David J. et al., *The Call Manager System: A Platform for Intelligent Telecommunications Services*, Speech Communication, vol. 23, (1997), pps. 129–139.

Dalgic, Ismail et al., *True Number Portability and Advanced Call Screening in a SIP–Based IP Telephony System*, IEEE Communications Magazine, vol. 37, No. 7, (Jul. 1999), pps. 96–101.

International Search Report for PCT Application Serial No. PCT/US00/26094, Dated Jan. 31, 2001.

International Search Report for PCT Application Serial No. PCT/US00/26594, Dated Feb. 6, 2001.

Watanabe, H. et al., *Development of the BTRON–BrainPad*, Proceedings 13$^{th}$ Tron Project International Symposium, Online!, (Dec. 4–7, 1996), pps. 95–103.

Gessler, Stefan et al., *PDAs as Mobile WWW Browsers*, Computer Networks and ISDN Systems, vol. 28, No. 1, (Dec. 1995), pps. 53–59.

International Search Report for PCT Application Serial No. PCT/US00/26650, Dated Feb. 19, 2001.

International Search Report for PCT Application Serial No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pps. 151–157.

International Search Report for PCT Application Serial No. PCT/US00/26649, Dated Feb. 6, 2001.

P. Srisuresh, G. Tsirtsis, P. Akkiraju, A. Heffernan, Internet Engineering Task Force, Internet Draft, "DNS Extensions to Network Address Translators" (DNS_ALG), <draft–ietf–nat–dns–alg–01.txt>, Oct. 1998, pp. 1 to 24.

P. Srisuresh, Internet Engineering Task Force, Internet Draft "Security for IP Network Address Translator (NAT) Domains," <draft–nat–security–00.txt.>, Nov. 1998, pp. 1 to 11.

P. Srisuresh, K. Eg, Internet Engineering Task Force, Internet Draft, "The IP Network Address Translator" (NAT), <draft–rfced–info–srisuresh–05.txt>, Feb. 1998, pp. 1 to 24.

P. Srisuresh, K. Egev, Internet Engineering Task Force, Internet Draft, "Traditional IP Network Address Translator (Traditional NAT)," <draft–ietf–nat–traditional–01.txt>, Oct. 1998, pp. 1 to 17.

P. Srisuresh, Matt Holdrege, Internet Engineering Task Force, Internet Draft, "IP Network Address Translator (NAT) Terminology and Considerations," <draft–ietf–nat–terminology–01.txt>, Oct. 1998, pp. 1 to 28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1 to 32.

R. G. Moskowitz, Internet Engineering Task Force, Internet Draft, "Network Address Translation Issues with IPsec," <draft–monskowitz–net66–vpn–00.txt>, Feb. 6, 1998, p. 1 to 8.

R. Thay, N. Doraswa and R. Gle, Internet Engineering Task Force, Internet Draft "IP Security," <draft–ietf–ipsec–doc–roadmap–02.txt.>, Nov. 1997, pp. 1 to 12.

T. Hain, Internet Engineering Task Force, Internet Draft, "Architectural Implications of NAT," <draft–iab–nat–implications–02.txt>, Oct. 1998, pp. 1 to 14.

W.T. Teo, S.W. Yeow, R. Singh, Internet Engineering Task Force, Internet Draft, "IP Relocation Through Twice Network Address Translators," <draft–ietf–nat–rnat–00.txt<, Feb. 1999, pp. 1 to 20.

W.T. Teo, S.W. Yeow, R. Singh, Internet Engineering Task Force, Internet Draft, "Reverse Twice Network Address Translators" (RAT), <draft–teoyeow–mip–rat–01.txt>, Dec. 1998, pp. 1 to 20.

W.T. Teo, Y. Li, Internet Engineering Task Force, Internet Draft, "Mobile IP Extension for Private Internets Support," <draft–teoyli–mobileip–mvpn–02.txt>, Feb. 1999, pp. 1 to 24.

Yakov Rekhter, Internet Engineering Task Force, Internet Draft, "Implications of NATs on the TCP/IP Architecture," <draft–ietf–nat–arch–implications–00.txt>, Feb. 1999, pp. 1 to 7.

K. Egevang, and P. Francis, Internet Engineering Task Force, ("IETF"), Request for Comments ("RFC") RFC–1631, "The IP Network Address Translator (NAT)", May 1994, pp. 1–10.

Borella, Michael, *Technology Update—Protocol Helps Stretch IPv4 Addresses*, "Network World", vol. 17, No. 3, Jan. 17, 2000, p. 43.

Kent, Stephen, *Evaluating Certification Authority Security*, Aerospace Conference, 1998 IEEE, Online, vol. 4, pp. 319–327 (Mar. 21–23, 1998).

Thayer, Rodney, *Bulletproof IP With Authentication and Encryption IPSec Adds a Layer of Armor to IP*, Data Communications, vol. 26, No. 16, pp. 55–58, 60 (Nov. 21, 1997).

Borella, M., Grabelsky, D., Lo, J., Tuniguchi, K., Internet Engineering Task Force, Internet Draft, "Realm Specific IP: Protocol Specification <draft–ietf–nat–rsip–protocol–.06.txt>", Mar. 2000, pp. 1–48.

Broella, M., Grabelsky, D., Lo, J., Tuniguchi, K., Internet Engineering Task Force, Internet Draft, "Realm Specific IP: Protocol Specification <draft–ietf–nat–rsip–protocol–.07.txt>", Jul. 2000, pp. 1–49.

Montenegro, G., Internet Engineering Task Force, Internet Draft, "RSIP Support for End–to–End IPsec," <draft–ietf–nat–rsip–ipsec–04.txt>, Jul. 2000, pp. 1 to 17.

Borella, M., Lo, J., Grabelsky, D., Montenegro, G., Internet Engineering Task Force, Internet Draft, "Realm Specific IP: Framework <draft–ietf–nat–rsip–framework–.05.txt>", Jul. 2000, pp. 1–30.

Borella, M., Montenegro, G., *RSIP: Address Sharing with End–To–End Security*, USENIX Conference, San Francisco, California, Mar. 9, 2000, pp. 1–9.

3COM SIP Solutions 1.0 benefits brochure. (4 total pages).

Sidhu, Ikhlaq and Bezaitis, Andrew, Eat or be eaten, www.americasnetwork.com/issues/99issues/991101/ 991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenburg, SIP: Session Initiation Protocol, Internet Engineering Task Force, draft–ietf–sip–rfc2543bis–02.ps. Sep. 4, 2000. (131 pages).

Borella, M., Lo, J., Grabelsky, D., Montenegro, G., IETF Proceedings presentation, Realm Specific IP: Protocol Specification <draft–nat–rsip–protocol–00.txt>, Apr. 9, 1999 (13 pages).

Marsan, Carolyn Duffy, The Next Best Things to Ipv6? Network World Fusion at http://www.nbwfusion.com/news/1999/0920ipv6.html, Mar. 29, 2000, pp. 1–3.

Borella, M., Lo, J., Grabelsky, D., Montenegro, G., Internet Engineering Task Force, Internet Draft, "Realm Specific IP: Framework <draft–ietf–nat–rsip–framework–.04.txt>", Mar. 2000, pp. 1–30.

P. Srisuresh, Matt Holdrege, Internet Engineering Task Force, Internet Draft, "IP Network Address Translator (NAT) Terminology and Considerations," <draft–ietf–nat–terminology–01.txt>, Aug. 1999, pp. 1 to 30.

IETF Mar. 1999 Proceedings, 2.7.10 Network Address Translators (nat), pp. 1–13.

Rosenberg, Jonathan D. and Shockey, Richard, The Session Initiation Protocol (SIP): A Key Component for Internet Telephony, ComputerTelephony.com, Jun. 2000, pp. 124–139.

G. Montene, Internet Engineering Task Force, Internet Draft, "Negotiated Address Reuse" (NAR), <draft–montenegro–aatn–nar–00.txt>, May 1998, pp. 1 to 22.

George Tsirtsis, Alan O'Neill, Internet Engineering Task Force, Internet Draft, "NAT Bypass for End 2 End 'Sensitive' Applications," <draft–tsirtsis–nat–bypass–00.txt>, Jan. 1998, pp. 1 to 5.

George Tsirtsis, Pyda Srishuresh, Internet Engineering Task Force, Internet Draft, "Network Address Translation—Protocol Translation" (NAT–PT), <draft–ietf–ngtrans–natpt–04.txt>, Jan. 1999, pp. 1 to 13.

Jeffrey Lo, K. Taniguchi, Internet Engineering Task Force, Internet Draft, "IP Host Network Address (and port) Translation," <draft–ietf–nat–hnat–00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1 to 21.

* cited by examiner

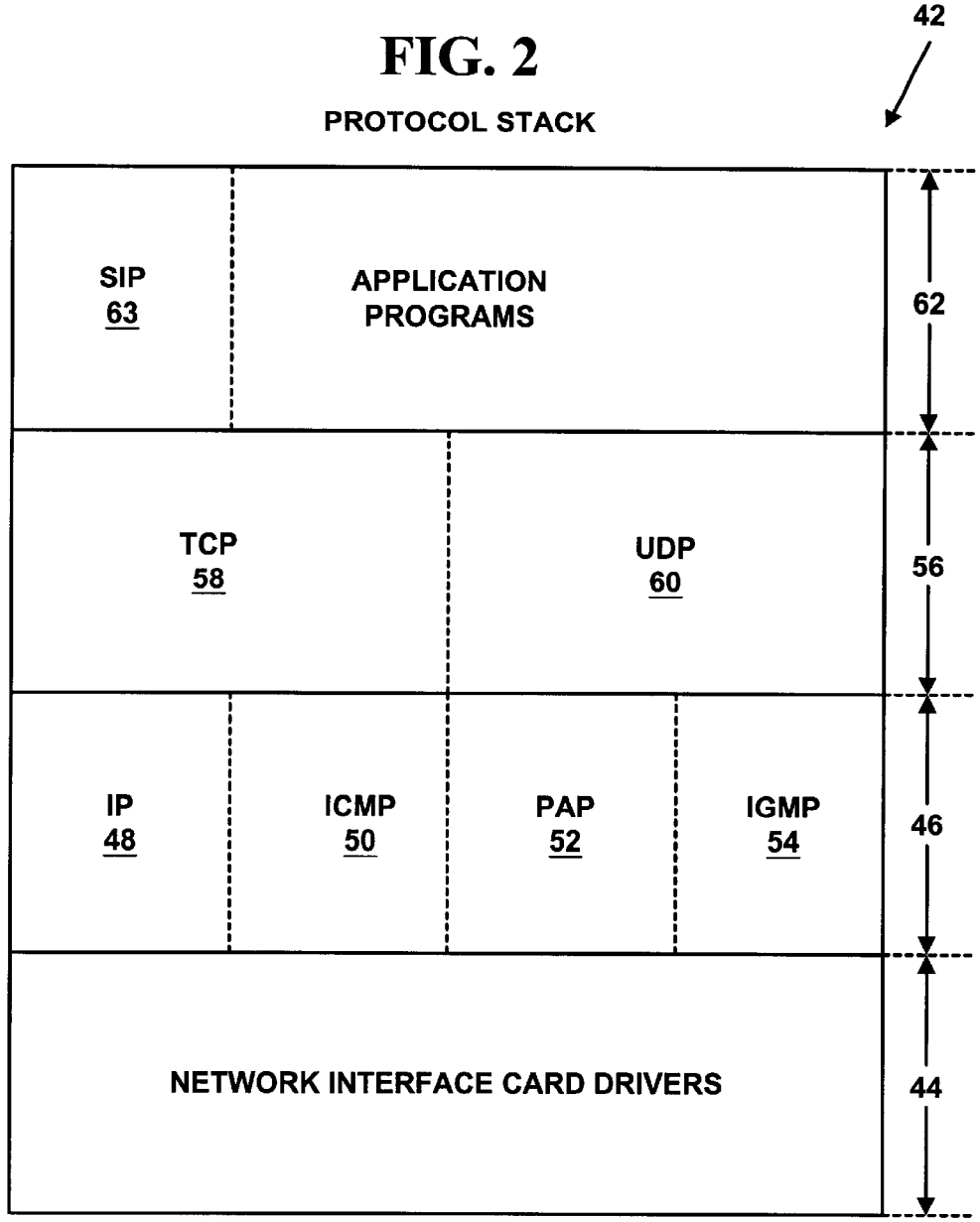

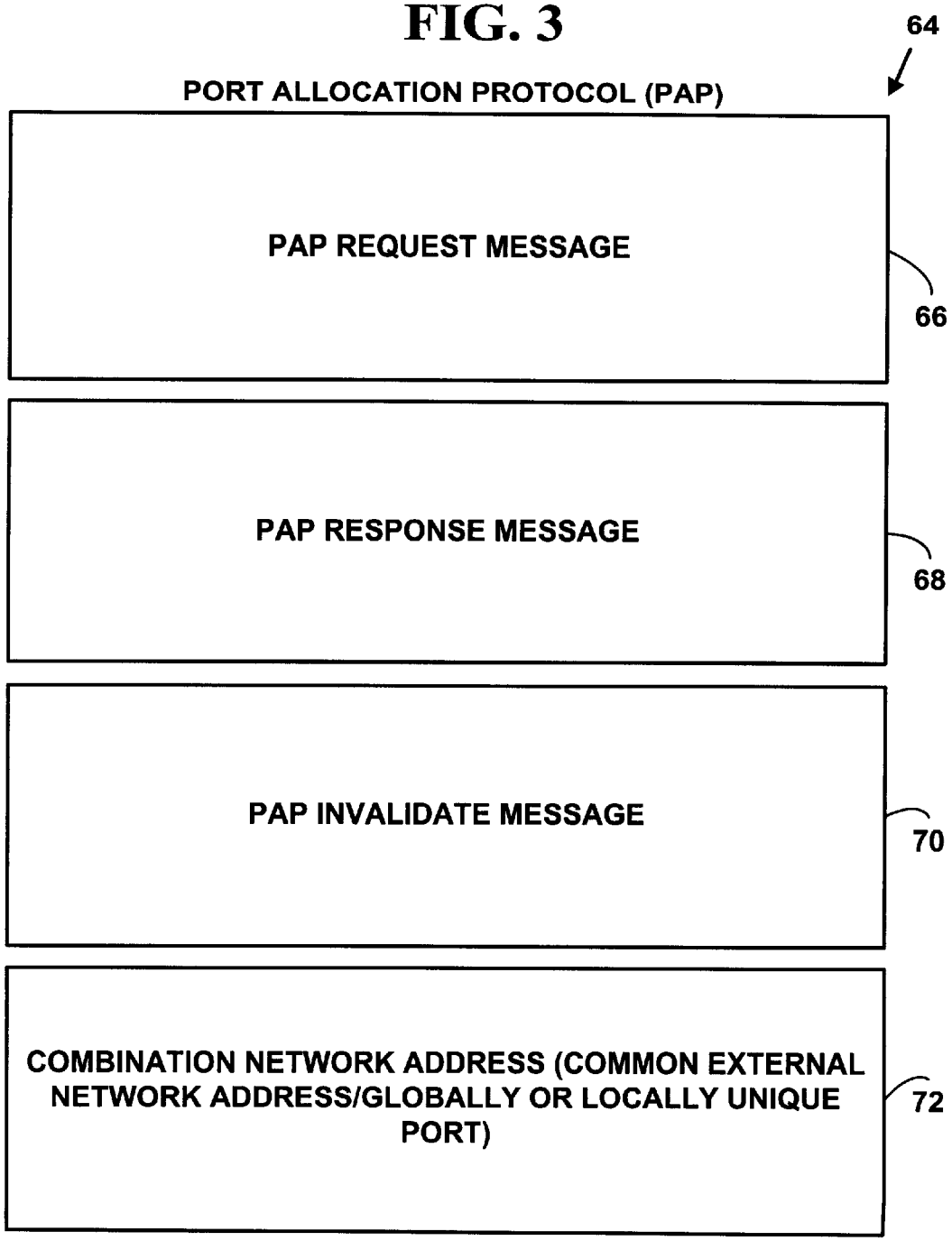

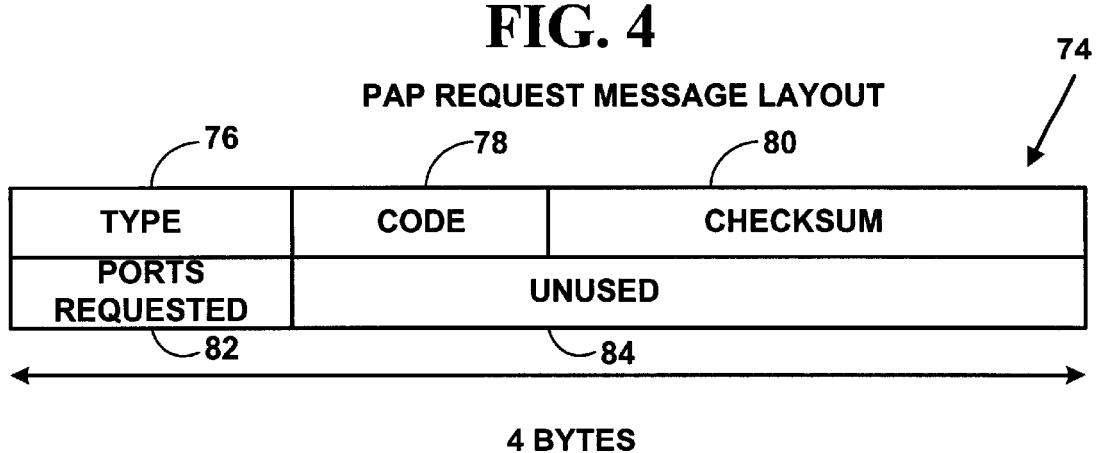
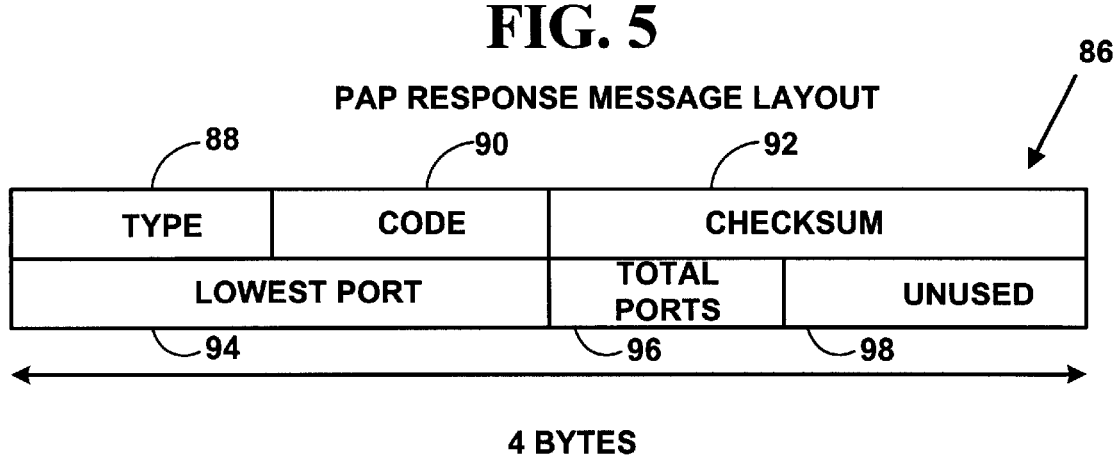
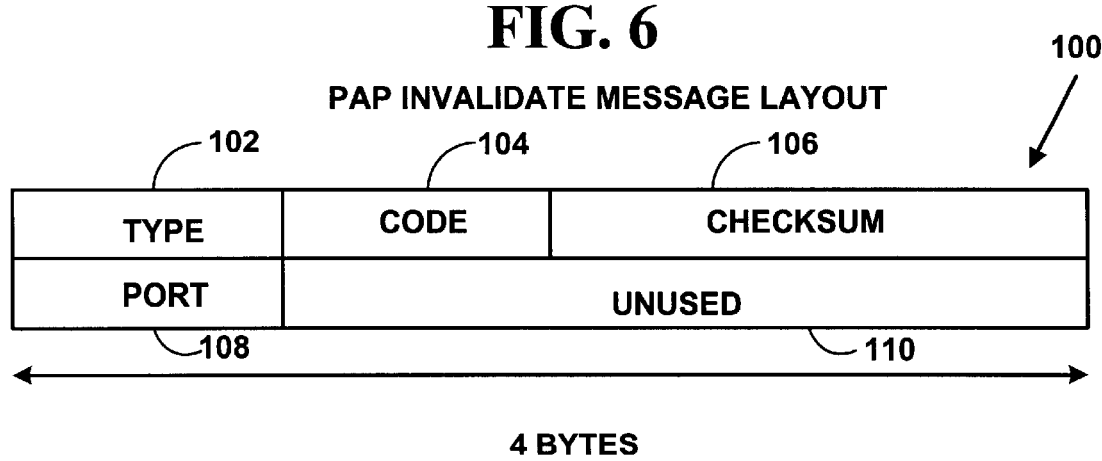

Combination Network Address:

| EXTERNAL NETWORK ADDRESS (e.g., EXTERNAL IP ADDRESS) [114] | GLOBALLY OR LOCALLY UNIQUE PORT [116] |
|---|---|
| 198.10.20.30 | 1032 |

COMBINATION NETWORK ADDRESS

| INTERNAL NETWORK ADDRESS [120] | LOWEST PORT [122] | NUMBER OF PORTS [124] | |
|---|---|---|---|
| 10.0.0.5 | 1026 | 32 | 126 |
| 10.0.0.3 | 1057 | 16 | 128 |

PORT-TO-INTERNAL-NETWORK ADDRESS TABLE

FIG. 11
SOURCE PORT TRANSLATION TABLE
(SPTT)

| LOCAL PORT | GLOBAL PORT |
|---|---|
| PROTOCOL | TIMESTAMP |

FIG. 12
IP ADDRESS TRANSLATION TABLE
(IPATT)

| DESTINATION PORT | INTERNAL DESTINATION IP ADDRESS |
|---|---|
| PROTOCOL | TIMESTAMP |

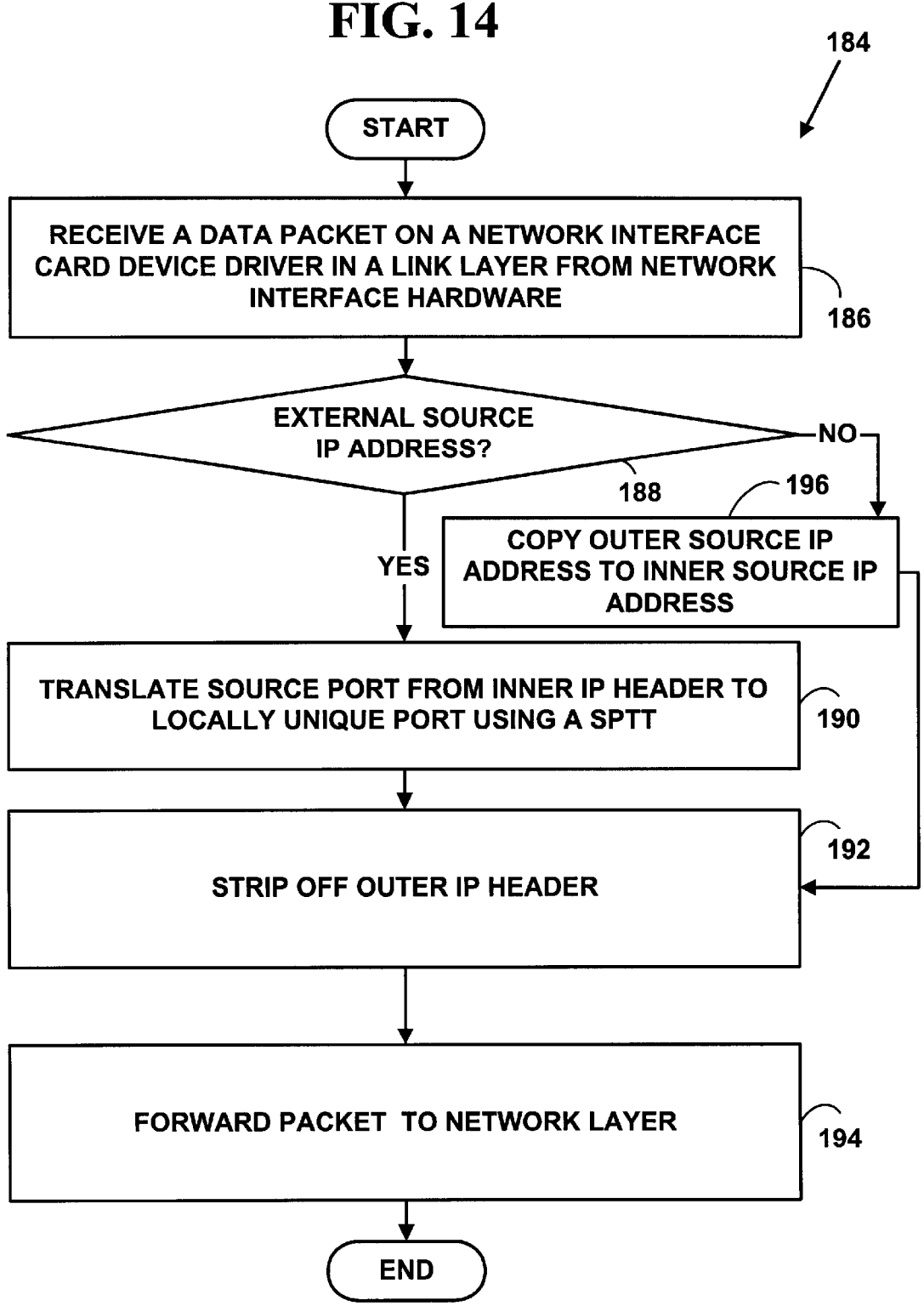

DISTRIBUTED NETWORK ADDRESS TRANSLATION FOR A NETWORK TELEPHONY SYSTEM

PRIORITY

This application is a continuation-in-part of U.S. patent application Ser. No. 09/035,600 filed Mar. 5, 1998, now U.S. Pat. No. 6,353,618 titled "Method and Protocol for Distributed Network Address Translation," and naming as inventors Michael S. Borella, David Grabelsky, Ikhlaq Sidhu, and Brian D. Petry.

FIELD OF THE INVENTION

The present invention relates to network telephony systems. More particularly, the present invention relates to providing distributed network address translation for a network telephony system.

BACKGROUND OF THE INVENTION

As the quality of network telephony systems has improved, there has been a migration of users from the traditional Public Switched Telephone Network (PSTN) to network telephony systems. With the proliferation of the Internet, Internet telephony has enabled distantly located users to communicate with one another using data protocols underlying the Internet. For example, the Internet Protocol suite along with various signaling protocols has made IP telephony a popular form of network telephony.

Session Initiation Protocol (SIP) is a signaling protocol that may be used to assist with call set-up, management, and teardown. Other signaling protocols, such as the ITU-T H.323, MEGACO, and MGCP protocols, may also be used to implement various signaling functions. While these network telephony systems have provided advantages in cost and flexibility, certain challenges have arisen. In particular, problems have arisen that are due, in part, to the success of the Internet as a whole.

The Internet Protocol (IP) is an addressing protocol designed to route traffic within a network or between networks. Current versions of IP such as IP version 4 (IPv4) are becoming obsolete because of limited address space. With a 32-bit address-field, it is possible to assign $2^{32}$ different addresses, which amounts to more than 4 billion possible addresses. Unique IP numbers are typically assigned to network devices (such as network phones) using IP, whether or not the network is connected to the Internet. Most organizations, such as corporations and universities, have multiple networks using IP, with multiple network devices assigned IP addresses. With the explosive growth of the Internet and intranets, IP addresses using a 32-bit address-field may soon be exhausted. IP version 6 (IPv6) proposes the use of a 128-bit address-field for IP addresses. However, a large number of legacy networks, including a large number of Internet nodes, will still be using older versions of IP with a 32-bit address space for many years to come.

Network Address Translation (NAT) has been proposed to extend the lifetime of IPv4 and earlier versions of IP by allowing a small home or office network to exist behind a single IP address. The single IP address is used for communication with external networks such as the Internet. Internally, the small home or office network uses private addressing. When a device or node using private addressing desires to communicate with the external world, a private address is translated to a common IP address by a NAT device. Network telephony systems may be located on networks having NAT routing devices. For example, SIP-aware routers with NAT functionality have been proposed by 3Com Corporation, the assignee of the present invention.

There are several problems associated with using NAT to extend the life of IP. NAT interferes with the end-to-end routing principal of the Internet, which specifies that packets flow end-to-end between network devices without the contents of any packet changing along a transmission route (see e.g., *Routing in the Internet*, by C. Huitema, Prentice Hall, 1995). Current versions of NAT replace a private network address in a data packet header with an external network address on outbound traffic, and replace an external address in a data packet header with a private network address on inbound traffic. This type of address translation is computationally expensive, causes security problems by preventing certain types of encryption from being used, and/or breaks a number of existing applications in a network that cannot do NAT (e.g., File Transfer Protocol ("FTP")). Because encryption may be desired in a network telephony system, NAT is therefore not an optimal solution.

Current versions of NAT may have problems scaling beyond a small network containing a few dozen nodes or devices because of the computational and other resources required. This may be unacceptable for organizations planning to implement large network telephony systems. NAT potentially requires that support for many different internal network protocols be specifically programmed into a translation mechanism for external protocols in a NAT device, such as a NAT router. As is known in the art, a router translates differences between network protocols and routes data packets to an appropriate network node or network device. Computational burdens placed on a NAT router may be significant and may degrade network performance, especially if several NAT-enabled stub networks share the same NAT router. In a worst case scenario, a NAT router translates every inbound and outbound data packet. This may result in delays, and thus, degradation of call quality for a network telephony system. Call quality is typically a primary concern in network telephony systems.

As is known in the art, Transmission Control Protocol (TCP) and User Datagram Protocol (UDP) are often used over IP in computer networks. TCP provides a connection-oriented, end-to-end reliable protocol designed to fit into a layered hierarchy of protocols that supports multi-network applications. UDP provides a transaction-oriented datagram protocol, where delivery and duplicate packet protection are not guaranteed. When NAT is used to translate a TCP/IP or UDP/IP data packet, the packet's IP, TCP, or UDP checksums are recalculated. When a port in a TCP or UDP header is translated, the packet's TCP or UDP checksums are also recalculated. This further increases the computational cost of translation in a NAT router.

When an IP address or port is translated with NAT, a new length may result for the data packet and a possible change in a TCP sequence number. A running sequence number offset (i.e., a delta) must then be maintained throughout the remainder of the connection. This delta must be applied to future traffic, further increasing computational time in a NAT router. In addition to TCP or UDP, a NAT router must be able to translate addresses and/or ports, change lengths, and maintain sequence numbers for a number of different protocols that may transmit an IP address or port number (e.g., SIP, FTP, H.323, H.324, CUSeeMe, RealAudio, Internet Relay Chat, and others). Thus, it is desirable to provide NAT without large computational burdens in a NAT router.

Besides being computationally expensive, NAT breaks some of the functionality of SIP and other signaling protocols. For example, a SIP-based network phone typically advertises a local IP address, even to network devices located outside the local network. This local IP address is likely to be completely different from an external address provided by a NAT device. Similarly, problems may arise while negotiating a media channel to exchange media (such as voice data) between two network phones located remotely from one another.

It would desirable to provide network address translation in a network telephony system while avoiding some of the problems of a NAT implementation.

SUMMARY OF THE INVENTION

In accordance with an illustrative embodiment of the present invention, some of the problems associated with addressing in a network telephony system are addressed.

According to one embodiment, a method for distributed network address translation in a network telephony system is provided. A first network phone with a first protocol, requests at least one locally unique port from a first network device. The first network phone and the first network device are located on a first network. The first network phone receives, with the first protocol, the at least one locally unique port from the first network device. At least one default or ephemeral port on the first network phone is replaced with the at least one locally unique port. A combination network address is created for the first network phone with the at least one locally unique port and a common external network address, thereby identifying the first network phone for communications with a second network device located on a second network. The second network device may, for example, be a second network phone. In a preferred embodiment, the first protocol is a Port Allocation Protocol, such as the Realm Specific Internet Protocol.

In another embodiment, the method additionally includes the first network phone sending a request to the first network device on the first network. The first network device routes the request to the second network. The first network device receives a reply on the first network for the first network phone on the common external network address for the first network from the combination network address. The first network device routes the reply to the first network phone using the at least one locally unique port from the combination network address.

In yet another embodiment, a method for distributed network address translation on a network telephony system is provided. A first network phone requests, with a first protocol, at least one locally unique port from a first network device. The first network phone and the first network device are located on a first network. The first network phone receives, with the first protocol, the at least one locally unique port from the first network device. A higher level protocol layer in a layered protocol stack on the first network phone creates, for a second network device on a second network, a request including a common external network address and a local port on the first network phone. The higher level protocol layer forwards the request to a lower level protocol layer in the first network phone. The lower level protocol layer translates the local port in the request to a locally unique port on the first network phone. The first network phone sends the request to a third network device on the first network. The third network device forwards the request to the second network device.

In still yet another embodiment, the method additionally includes the third network device receiving a response on the common external network address for the first network phone from the second network device. The response includes the common external network address and the locally unique port for the first network phone. The third network device sends the response to the first network phone. The lower level protocol layer in the first network phone translates the locally unique port in the response to the local port for the first network phone. The lower level protocol layer forwards the response to the higher level protocol layer on the first network phone.

In another embodiment of the present invention, a system for distributed network address translation in a network telephony system is provided. The system includes a first network phone on a first network, with a combination network address from a Port Allocation Protocol. The combination network address allows distributed network address translation and includes a locally unique port on the first network and a common external network address for the first network. The first network phone is operable to transmit an request, including the combination network address. The system also includes a second network phone on a second network, operable to receive the invite request and to transmit a response to the first network phone. The response also includes the combination network address.

BRIEF DESCRIPTION OF THE DRAWINGS

Preferred embodiments of the present invention are described with reference to the following drawings, wherein:

FIG. 2 is a block diagram illustrating a layered protocol stack for distributed network address translation in a network telephony system according to an exemplary embodiment of the present invention;

FIG. 3 is a block diagram illustrating a Port Allocation Protocol (PAP) according to an exemplary embodiment of the present invention;

FIG. 4 is a block diagram illustrating a PAP request message layout according to an exemplary embodiment of the present invention;

FIG. 5 is a block diagram illustrating a PAP response message layout according to an exemplary embodiment of the present invention;

FIG. 6 is a block diagram illlLlstrating a PAP invalidate message layout according to an exemplary embodiment of the present invention;

FIG. 7 is a block diagram illustrating a combination network address layout for a combination network address according to an exemplary embodiment of the present invention;

FIG. 8 is a block diagram illustrating a port-to-internal address table layout maintained by a router or other device implementing PAP, according to an exemplary embodiment of the present invention;

FIG. 11 illustrates a SPTT layout for use in a network telephony system, according to an exemplary embodiment of the present invention;

FIG. 12 illustrates an IPATT layout for use in a network telephony system, according to an exemplary embodiment of the present invention;

FIG. 14 is a flow diagram illustrating a method for inbound distributed network address translation using port translation, for use in a network telephony system, according to an exemplary embodiment of the present invention.

DETAILED DESCRIPTION OF THE PRESENTLY PREFERRED EMBODIMENT(S)

Exemplary Network Telephony System

Figure 1:
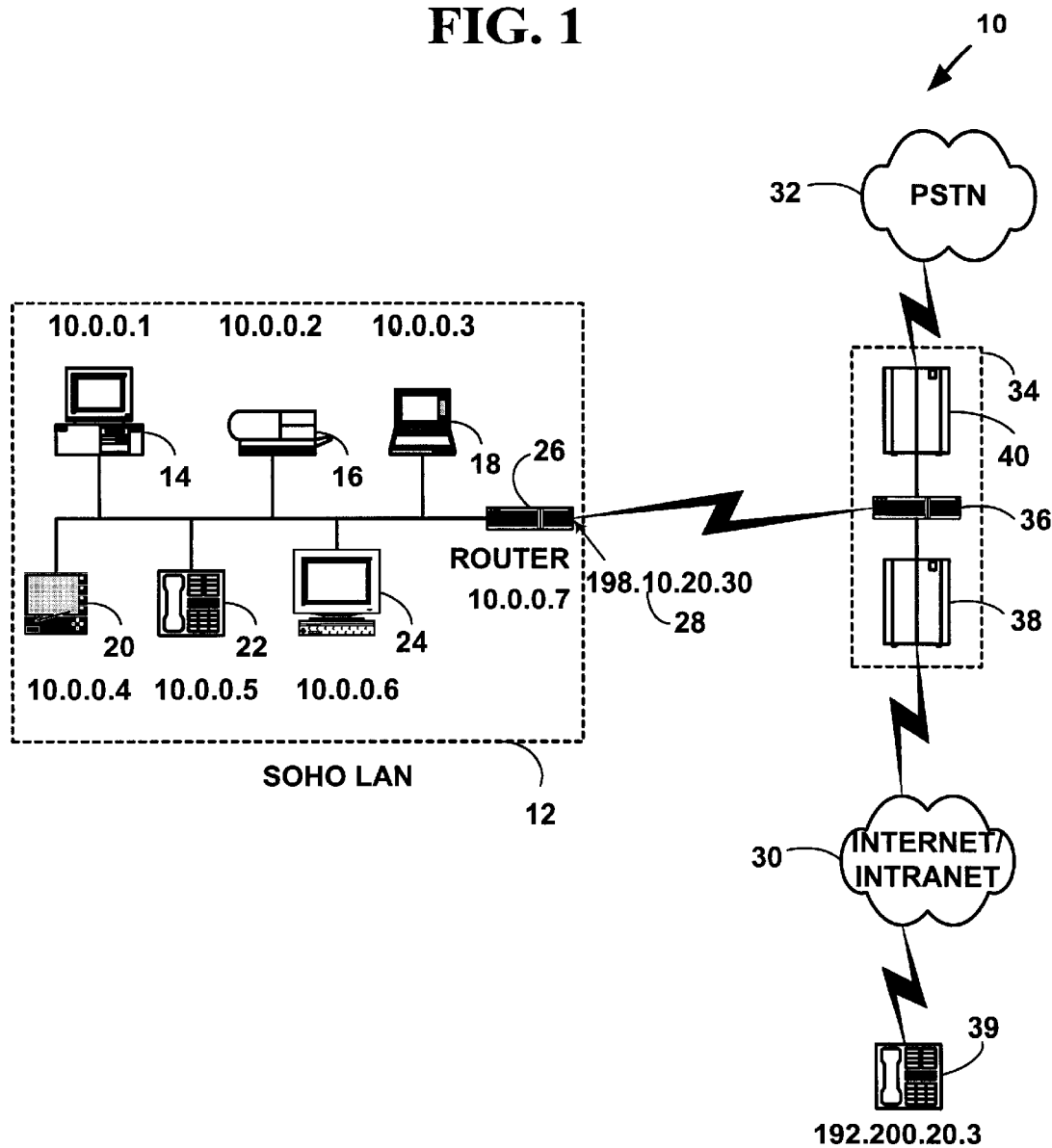
FIG. 1 is a simplified block diagram illustrating a network telephony system according to an exemplary embodiment of the present invention.

FIG. 1 is a simplified block diagram illustrating a network telephony system 10 according to an exemplary embodiment of the present invention. System 10 includes a first computer network 12 with multiple network devices (14, 16, 18, 20, 22, 24) and a router 26 to route data packets to another external computer network. The multiple network devices include any of computers (14, 18), printers 16, telephony proxy servers 24, hand-held devices 20, network phones 22, and/or other network devices not illustrated in FIG. 1. A typical network telephony system will likely include many network phones similar to network phone 22. In addition, other network phones may exist on external computer networks. First computer network 12 has an external common network address 28 (e.g., an IP address 198.10.20.30) to identify first network 12 to an external computer network, such as a second computer network 30 and/or a third computer network 32 external to first computer network 12. The multiple network devices (14, 16, 18, 20, 22, 24, and 26) have an internal network address for first computer network 12 (e.g., 10.0.0.X, explained below). A network access service provider 34 with a router 36 routes data packets to/from first computer network 12 to second computer network 30 and/or third computer network 32 through a second network switch 38 and/or a third network switch 40. In one embodiment of the present invention, first network 12 is a Small Office/Home Office (SOHO) Local Area Network (LAN), also called a "Legacy" LAN, second network 30 is an internet, such as the public Internet, and third network 32 is a Public Switched Telephone Network (PSTN). The second computer network 30 may contain additional access networks having one or more network phones similar to network phone 22. For example, although a second network phone 39 is shown linked to second network 30, second network phone 39 may alternatively be linked to an access network linked to or composing the second network 30. Other network types and network components may also be used and the present invention is not limited to the network types and network components described in the illustrative embodiment of FIG. 1.

An operating environment for network devices and routers of various embodiments of the present invention may include a processing system with at least one high speed Central Processing Unit (CPU) and a memory. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU-executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile (e.g., Random Access Memory (RAM)) or non-volatile (e.g. Read-Only Memory (ROM)) mass storage system readable by the CPU. The computer readable medium includes cooperating or interconnected computer readable media, which exist exclusively on the processing system or which are distributed among multiple interconnected processing systems that may be local or remote to the processing system. In network address translation schemes known in the art, router 26 translates an internal network address, such as an internal IP address, used on first network 12 to an external network address, such as an IP address for outgoing traffic to second network 30 or third network 32. Router 26 also translates an external network address to an internal network address for incoming traffic from second network 30 or third network 32. A NAT router may assume the entire computational burden for network address translation. For large stub networks or 50 or more network devices, the NAT router may become a bottleneck. In the worst case, every packet passing through the NAT router will require address translation. For more information on network address translation for the Internet protocol, see "The IP Network Address Translator (NAT)," Internet Engineering Taskforce (IETF) Request for Comments (RFC), RFC-1631, and "NAT Bypass for 'End 2 End' Sensitive Applications," by G. Tsirtsis and A. O'Niell, IETF Internet Draft, <draft-tsirtsis-nat-bypass-00.txt>, January, 1998. The IETF World-Wide Web site on the Internet can be reached at the Uniform Resource Locator "www.ietforg."

In the network telephone system 10, the network phone 22 may be used to place and receive network telephony calls. Other devices, such as PC 14 or PC 18 may be configured with appropriate software, firmware, and/or hardware to function as a network phone. For purposes of illustration, the description herein will be described with reference to the network phone 22 as used in a SIP-based network telephony system. The proxy server 24 may be used to perform routing of signaling requests and responses, such as routing of an inbound requests from the second network phone 39 located on second network 30, where the inbound request is directed to network phone 22.

Session Initiation Protocol

In a preferred embodiment, the system 10 utilizes the SIP signaling protocol. SIP is described in Handley, et al., "SIP: Session Initiation Protocol," IETF RFC 2543, March 1999, which is incorporated by reference herein. Also incorporated by reference herein is Schulzrinne H. and Rosenberg J., "The Session Initiation Protocol: Internet—Centric Signaling," IEEE Communications Magazine, October 2000, Vol. 38, No. 10. Other signaling protocols, such as H-323, MGCP, MEGACO, and other standard or proprietary techniques may alternatively be used.

In a SIP implementation, network phones such as network phones 22 and 39 may each contain a SIP client and a SIP server. The proxy server 24 may also contain a SIP client and a SIP server. Additional user agents may be included in the network 10, as may additional proxy servers. In addition, system 10 may also include other servers, such as registration servers, redirect servers, and/or location servers. One or more of these server types may be combined into one physical device. A typical implementation for SIP-based IP telephony is a system of SIP-based network phones such as the 3Com® SIP phone, offered by 3Com Corporation, the assignee of the present invention. Another typical implementation includes one or more personal computers with software to perform SIP user agent functions, and user interface hardware, such as microphones and speakers to serve as means for communicating voice information. Other user interfaces, such as those used for video and/or other types of communication data, may also be used and are intended to be within the scope of the present invention.

The system 10 may be used to implement IP telephony, as well as other telephony-related functions. Further details on how such a system operates may be found by referring to the following patent applications, assigned to the assignee of the present invention, and incorporated by reference herein:

"System and Method for Providing Fault Tolerance in a Network Telephony System," to Tripathi, Ser. No. 09/685,286;

"System and Method for Providing Access to a Content Server," to Schuster, et al., Ser. No. 09/677,077;

"System and Method for Providing Telephone Service Having Private Branch Exchange Features in a Data Network Telephony System" to Schuster et al., Ser. No. 09/515,365;

"System and Method for Providing a Wireless Data Network Telephone System" to Schuster et al., Ser. No. 09/515,798;

"System and Method for Accessing a Network Server Using a Portable Information Devices Through a Network Based Telecommunication System" to Schuster et al., Ser. No. 09/515,969;

"System and Method for Accessing Radio Programs Using a Data Network Telephone in a Network Based Telecommunication System" to Schuster et al., Ser. No. 09/516,269;

"System and Method for Providing Local Information in a Data Network Telephony System" to Schuster et al., Ser. No. 515,366;

"System and Method for Enabling a Portable Information Device for Use in a Data Network Telephone System" to Schuster et al, Ser. No. 09/515,795;

"Dialing Token for Initiating a Telephone Connection in a Data Network Telephone System" to Schuster et al, Ser. No. 09/515,364;

"Personalized Call Announcement on a Data Network Telephony System" to Schuster, et al., Ser. No. 09/515,387;

"Personalizing a Data Network Appliance on a Data Network Telephony System" to Schuster, et al., Ser. No. 09/515,970;

"Proximity-Based Registration on a Data Network Telephony System" to Schuster, et al., Ser. No. 09/515,796;

"System and Method for Providing User Mobility Services on a Telephony Network" to Schuster, et al., Ser. No. 09/451,388;

"System and Method for Providing Call-Handling Services on a Telephony Network" to Schuster, et al., Ser. No. 09/470,879;

"Method, Apparatus and Communications System for Companion Information and Network Appliances" to Wang, et al., Ser. No. 09/181,431;

"System and Method for Controlling Telephone Service Using a Wireless Personal Information Device" to Schuster, et al., Ser. No. 09/406,321;

"System and Method for Advertising Using Data Network Telephone Connections" to Schuster, et al., Ser. No. 09/406,320;

"System and Method for Providing User-Configured Telephone Service in a Data Network Telephony System" to Sidhu, et al., Ser. No. 09/405,283;

"System and Method for Accessing a Network Server Using a Portable Information Device Through a Network Based Telecommunication System" to Schuster, et al., Ser. No. 09/406,322;

"System and Method for Interconnecting Portable Information Devices Through a Network Based Telecommunication System" to Schuster, et al., Ser. No. 09/406,152;

"System and Method for Enabling Encryption on a Telephony Network" to Schuster, et al., Ser. No. 405,981;

"System and Method for Associating Notes with a Portable Information Device on a Network Telephony Call" to Schuster, et al., Ser. No. 09/406,151;

"System and Method for Providing Shared Workspace Services over a Telephony Network" to Schuster, et al., Ser. No. 09/406,298;

"System and Method for Providing Service Provider Configurations for Telephones in a Data Network Telephony System" to Schuster, et al., Ser. No. 09/406,066;

System and Method for Using a Portable Information Device to Establish a Conference Call on a Telephone Network" to Schuster, et al., Ser. No. 09/406,128;

"Multiple ISP Support for Data Over Cable Networks" to Ali Akgun, et al., Ser. No. 09/321,941;

"Method and System for Provisioning Network Addresses in a Data-Over-Cable System" to Ali Akgun, et al., Ser. No. 09/218,793; and "Network Access Methods, Including Direct Wireless to Internet Access" to Yingchun Xu, et al., Ser. No. 08/887,313.

Exemplary Network Telephony Call Sequence

A first user (the caller) located at network phone 22 may call a second user (the callee) located at the second network phone 39 on the second network 30 according to the following procedure, described in IETF RFC 2543. The network phone 22 transmits an INVITE request to a proxy server located on the second network 30. The INVITE request includes a FROM field to set forth the caller's SIP address and a TO field to set forth the callee's SIP address. The proxy server will typically be located in the same domain as is specified in the FROM field. The proxy server 124 may use a location service locally or remotely located to the proxy server 124 to determine the location of the callee, identified in the INVITE request. For example, the callee may have recently moved from one location to a second location (which may be on the second network 30 or elsewhere). When the proxy server determines that the second user is located at the second network phone 39, the proxy server transmits an INVITE request to the second network phone 39. The INVITE request may simply be a forwarded version of the INVITE request from the network phone 22, containing the SIP addresses of the caller and the callee. Upon receiving the INVITE request, the second network phone 39 may transmit a response message to the proxy server. The proxy server may then transmit a response message back to the network phone 22. If the transmitted response message is a success response (i.e. represented by a SIP "200 OK" response), then the network phone 22 may send an ACK message (not shown) back to the second network phone 39 to complete the call initiation process. The ACK message may be sent through the same path as the INVITE request and response messages, or it may be sent directly from the network phone 22 to the second network phone 39, bypassing the proxy server. After the call has been initiated using the SIP signaling protocol, the call is connected and data (including voice information, etc.) can flow on a data channel between the network phone 22 and the second network phone 39.

SIP includes two major architectural elements: the user agent (UA) and the network server. The UA resides at the SIP end stations, (e.g. the network phones 22 and 39), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server. Not all server types are needed to implement the various embodiments of the present invention. The communication services to be provided will determine which servers are present in the communication system. In the example illustrated in FIG. 1, only a proxy server is shown. The present invention may be implemented in systems of varying complexity, having different combinations of server types and quantities.

The example described above involves a SIP UAC issuing a request, a SIP proxy server acting as an end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Universal Resource Indicators (SIP-URIs), which are of the form sip: user@host.domain. Other addressing conventions may also be used.

To be reachable at the first network phone 22, a user may initiate a registration process, such as by entering information into the network phone 22, or by transmitting user attributes from a portable information device (such as a Personal Digital Assistant (PDA)) to the network phone 22 to enable registration. The network phone 22 formats a REGISTER request that includes the user's SIP URI (or the SIP URI of the user's portable information device) in the TO field, the network phone's SIP URI in the FROM field, and the SIP URI of a registration server (which may be colocated with the proxy server 24 shown in FIG. 1) in the REQUEST-URI field and sends the REGISTER request to the registration server. The registration server registers the user's SIP URI with the IP address of the network phone 22 and returns a 200 OK response to the network phone 22. As another alternative, a user's portable information device may be assigned a device address, such as an IP address, that is different from the device address of the network phone 22. If a signaling protocol other than SIP is used, then the procedure may vary somewhat from the embodiment described above, which utilizes SIP.

The message sequence described above applies to the case where the SIP URI for the registration server is known. Other approaches to registration are possible, such as broadcasting to the registration multicast address "sip.mcast.net" (224.0.1.75), and are discussed in further detail in IETF RFC 2543.

Once the user's SIP URI is registered with the registration server, subsequent calls to the user's SIP URI are resolved to the address of the network phone 22, to which the user is registered. Thus, if a call is placed to the user's SIP URI, the network phone 22 will alert the user of an incoming call.

Redirect servers may be used to process an INVITE message by sending back the SIP-URI where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several phones at once until somebody takes the call. Registrar servers are used to record the SIP address (SIP URI) and the associated IP address. The most common use of a registrar server is for the UAC to notify the registrar where a particular SIP URI can be reached for a specified amount of time. When an INVITE request arrives for the SIP URI used in a REGISTER message, the proxy or redirect server handles the request accordingly.

The network phone 22 in the system 10 preferably has a pre-programmed device identifier (e.g. phone number), represented as a SIP-URI of the form sip: user@domain. An example is sip: 1234567890@sample.com. After power-up, the network phone 22 sends a SIP REGISTER message to the default registrar. Referring back to FIG. 1, the default registrar for the network phone 22 may be the proxy server 24. When a call arrives at the proxy server 24 for a registered SIP URI, the proxy server 24 will forward the call to the appropriate destination. If a network phone is moved to a new location, all calls to the associated SIP URI will still be properly routed to that device. In other words, the system 10 provides device mobility in the sense that calls will "follow" the network phone according to its SIP URI. This is especially useful if the network phone 22 is running the DHCP (Dynamic Host Configuration Protocol) so that when the location is changed, the IP address is also automatically changed.

An advantage of the system 10 is that once the call is established between two or more network phones, the network 12, the second network 30, and/or the third network 32 provide data connectivity for up to a plurality of data communications channels. For example, the network phone 22 may be operable to communicate voice signals as voice-over-data packets on a voice-over-data channel. The network phone 22 may also be operable to communicate additional types of data, such as video data, on one or more additional data channels. Voice-over-data functionality preferably conforms to a protocol for formatting voice signals as digital data streams. While any suitable protocol may be used, the media (voice signal) is preferably transported via the Real Time Protocol (RTP), inside User Datagram Protocol (UDP) packets. The Internet Protocol (IP) is also preferably used. RTP is described in H. Schulzrinne et al., "RTP: A Transport Protocol for Real-Time Applications," IETF RFC 1889, January. 1996, which is incorporated herein by reference.

In a preferred embodiment of the present invention, Distributed Network Address Translation (DNAT) is used. One implementation of DNAT is described in Borella et al., "Realm Specific IP: Protocol Specification," <draft-ietf-nat-rsip-protocol-07.txt>, July 2000, and in Borella et al., "Realm Specific IP: Framework," <draft-ietf-nat-rsip-framework-05.txt>, July 2000, both of which are incorporated by reference herein, and both of which may be accessed at the IETF web site (www.ietf.org). Network devices (14, 16, 18, 20, 22, 24) on first computer network 12 request a set of locally unique ports from router 26 for external communications with external network 30 or third network 32. Network devices (14, 16, 18, 20, 22, 24) replace local or default or ephemeral ports with the locally unique ports and use a combination network address including the locally unique port and a common external network address (e.g., an IP address) for communications with the external network 30 and 32. A default port is typically statically assigned. An ephemeral port is typically dynamically assigned for a duration of time. The communications with the external networks 30 and 32 may include one or more calls and/or call signaling completed as part of a network telephony call.

DNAT Protocol Stack

FIG. 2 is a block diagram illustrating a layered protocol stack 42 for distributed network address translation in a network telephony system according to an exemplary embodiment of the present invention. Layered Protocol stack 42 is described with respect to Internet Protocol suites comprising from lowest-to-highest, a link, network, transport, and application layer. However, more or fewer layers could also be used, and different layer designations could also be used for the layers in protocol stack 42 (e.g., layering based on the Open Systems Interconnection ("OSI") model).

Network devices (14, 16, 18, 20, 22, 24) are connected to first network 12 with a link layer 44. Link layer 44 includes Network Interface Card ("NIC") drivers for the hardware network devices connecting the network devices to computer network 12. Above link layer 44 is a network layer 46. Network layer 46, includes an IP layer 48. As is known in the art, IP 48 is an addressing protocol designed to route traffic within a network or between networks. IP layer 48, hereinafter IP 48, is described in Internet Engineering Task Force ("IETF") Request For Comments ("RFC") RFC-791, incorporated herein by reference.

In addition to IP 48, three other protocol layers are used in network layer 46: Internet Control Message Protocol ("ICMP") layer 50, Port Allocation Protocol ("PAP") layer 52 and Internet Group Management Protocol ("IGMP") layer. However, more or fewer protocols could also be used.

ICMP layer 50, hereinafter ICMP 50, is used for network management. The main functions of ICMP 50 include error reporting, reachability testing (e.g., "pinging") congestion control, route-change notification, performance, subnet addressing and other maintenance. For more information on ICMP 50, see RFC-792, incorporated herein by reference.

PAP layer 52 allocates locally unique ports to a network device, such as the network phone 22. In one embodiment of the present invention, PAP layer 52, is a separate protocol layer in network layer 46. In another embodiment of the present invention, PAP layer 52 is implemented as part of ICMP layer 50 and is not a separate protocol layer. PAP layer 52 is explained below.

IGMP layer 54, hereinafter IGMP 54, is responsible for User Datagram Protocol ("UDP") broadcasting or multicasting, such as sending UDP packets to an IP 48 device or to multiple IP devices on a network. IGMP 54 can also be used with a Transmission Control Protocol. For more information on IGMP 54, see RFC-1112, incorporated herein by reference.

Above network layer 46 is a transmission layer 56. Transmission layer 56 includes a Transmission Control Protocol ("TCP") layer 58 and a UDP layer 60. TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58, see RFC-793, incorporated herein by reference.

UDP layer 60, hereinafter UDP 60, provides a connectionless mode of communications with datagrams in an interconnected set of computer networks. UDP 60 provides a transaction-oriented datagram protocol, where delivery and duplicate packet protection are not guaranteed. For more information on UDP 60, see RFC-768, incorporated herein by reference. UDP 60 is used in many typical network telephony systems.

Protocol stack 42 need not include both TCP 58 and UDP 60. Either TCP 58 or UDP 60 can be used without the other. If only TCP 58 is used, then IGMP 54 and UDP 60 may be removed from protocol stack 42. If only UDP 60 is used, IGMP 50 and TCP 58 may be removed from protocol stack 42. However, UDP 60 can also be used with ICMP 50 and IGMP 54 without TCP 50.

Above transmission layer 56 is an application layer 62 where application programs to carry out desired functionality for a network device reside. For example, the application programs for network phone 22 may include network telephony application programs, such as a SIP application 63. Other applications are also likely to be present in application layer 62.

DNAT Protocol

FIG. 3 is a block diagram illustrating a Port Allocation Protocol ("PAP") 64 according to an exemplary embodiment of the present invention. PAP 64 is implemented in a separate PAP layer 54 or as an integral part of ICMP 50 in protocol stack 42 (FIG. 2). PAP 64 includes a PAP request message 66, a PAP response message 68, a PAP invalidate message 70 and a combination network address 72. In an illustrative embodiment of the present invention, PAP request message 66 is sent from network device (14, 16, 18, 20, 22, 24) to router 26 to request a block of locally unique port numbers. In another embodiment of the present invention, PAP 64 is used with another network device (e.g., a port server or other network device separate from router 26). For example, PAP 64 could be used with the proxy server 24. Fields in the PAP messages (66, 68, 70) follow standard ICMP 50 message format. Other message layouts (i.e., Non-ICMP 50 message format) and more or fewer messages could also be used for PAP 64 messages.

FIG. 4 is a block diagram illustrating a PAP request message layout 74 according to an exemplary embodiment of the present invention. Type-field 76 is one-byte and has a value of 32. Code-field 78 is one-byte and has a value of zero for ports under 10,000 and a value of 128 for ports above 10,000. Checksum-field 80 is two-bytes, and has a value of a 1's complement sum of the entire PAP request message 66 layout 74. As is known in the art, a 1's complement for a value written in binary or base-2 (i.e., has only zero's and one's) is the inverse of an existing one or zero. For example, a 1's complement of $110_2$ is $001_2$.

Ports-requested-field 82 is one-byte and has a variable value indicating a number of locally unique ports requested by a network device. By default, ports-requested-field 82 is 16 or 32, which is a reasonable number for most network devices. Other default numbers could also be used. Unused-field 84 is three-bytes and has a value of zero. Other layouts, values, and field sizes could also be used for PAP request message 66.

In one embodiment of the present invention, a network device (such as network phone 22) transmits PAP request message 66 upon being powered-on ("booted up"). PAP 64 is associated with Dynamic Host Configuration Protocol ("DHCP") or BOOTstrap Protocol ("BOOTP"). DHCP is a protocol for passing configuration information such as IP 48 addresses to hosts on an IP 48 network. For more information on DHCP, see RFC-1541, incorporated herein by reference. The format of DHCP messages is based on the format of BOOTP messages described in RFC-951 and RFC-1542, incorporated herein by reference. From a network device's point of view, DHCP is an extension of the BOOTP mechanism.

In another embodiment of the present invention, network devices (14, 16, 18, 20, 22, 24) request locally unique ports after boot-up when a protocol layer in layered protocol stack 42 makes an initial request for an external network (e.g., 30 or 32). Network devices (14, 16, 18, 20, 22, 24) may also request locally unique ports when the number of locally unique ports required exceeds the number of locally unique ports allocated.

PAP request message 66 is sent from a network device (14, 16, 18, 20, 22, 24) to router 26 after attaching an IP 48 header or other message header. A PAP response message 68 is sent from router 26 back to network devices (14, 16, 18, 20, 22, 24), either confirming or denying the request included in PAP request message 66.

FIG. 5 is a block diagram illustrating a PAP response message layout 86 according to an exemplary embodiment of the present invention. Type-field 88 is one-byte and has value of 32. Code-field 90 is one-byte and has a value of zero for failure and one for success. Checksum-field 92 is two-bytes, and is a 16-bit 1's complement sum of the entire PAP response message 68. Lowest-port-field 94 is two-bytes and is the lowest locally unique port number allocated in a block of locally unique ports. Total-ports-field 96 is one-byte and is the total number of locally unique ports allocated to the network device. Unused-field 98 is one-byte and has a value of zero. Other layouts, values, and field sizes could also be used for PAP response message 68.

Upon receiving a successful PAP response message 68, a network device saves the block of locally unique ports that it may use. The locally unique ports are saved in a data structure with a flag-field indicating whether the locally unique port is allocated or unused. Table 1 is pseudo-code for an exemplary data structure to store locally unique port information. Other data structures or layouts could also be used.

TABLE 1

```
struct locally_unique_ports
{
    int port_number;
    flag status:1; /* one bit flag, 0 = unused, 1 = allocated */
} gu_ports[MAX_GU];
int number_of_gu_ports; /* number of locally unique ports allocated */
```

The one or more locally unique ports are allocated to protocols and applications in layered protocol stack 42 on a network device to replace local or default ports. Upon receiving an unsuccessful PAP response message 68, the network device may send another PAP request message 66 for fewer ports. If router 26 cannot allocate a large enough block of contiguous locally unique ports for the network device, it may send a PAP response 68 with a success code, but allocate fewer locally unique ports than requested.

FIG. 6 is a block diagram illustrating a PAP invalidate message layout 100. A PAP invalidate message 70 is used to invalidate or de-allocate a block of locally unique ports currently allocated to a network device. Type-field 102 is one-byte and has a value of 32. Code-field 104 is one-byte and has a value of two. Checksum-field 106 is two-bytes and is a 1's complement sum of the entire PAP invalidate message 72. Port-field 108 is one-byte and has a value of a locally unique port number used by the network device. Unused-field 110 is three-bytes and has a value of zero. Other layouts, values and field sizes could also be used for PAP invalidate message 70.

It is possible that two network devices may be allocated overlapping blocks of locally unique port numbers as a result of a crash or reboot by router 26 (or other device implementing PAP 64). Router 26 should send PAP invalidate messages 70 to invalidate all locally unique ports in use upon reboot to help prevent this problem. A network device (14, 16, 18, 20, 22, 24) also sends a PAP invalidate message 70 when it no longer needs a locally unique port.

FIG. 7 is a block diagram illustrating a combination network address layout 112 for combination network address 72. Other layouts could also be used. Combination network address layout 112 includes a common external network address 114 such as an IP 48 address (e.g., common network address 28), and a locally unique port 116 obtained by sending a PAP request message 66 and receiving a PAP response message 68 from a network device. Network devices (14, 16, 18, 20, 22, 24) use combination network address 72 for communications with external second network 30 or third network 32. Common external network address 114 identifies first computer network 12 to an external second computer network (e.g., 30 or 32).

As is known in the art, to identify separate data streams, TCP 58 provides a source port field and a source address field in a TCP header. For more information on TCP headers, see RFC-793. Since local or default port identifiers are selected independently by each TCP 58 stack in a network, they are typically not unique. To provide for unique addresses, a local Internet address identifying TCP 58 can be concatenated with a local port identifier and a remote Internet address and a remote port identifier to create a "socket" that will be unique throughout all networks connected together.

In an illustrative embodiment of the present invention, the source port in a header is given a locally unique port obtained with PAP 64 and given a common external network address. Together they uniquely identify applications and protocols on network devices (14, 16, 18, 20, 22, 24) on first computer network 12 to second external computer network (e.g., 30 or 32) with a value conceptually similar to the socket used by TCP 58.

As is also known in the art, UDP 60 also has a source port field in a UDP header. For more information on UDP 60 headers, see RFC-768. The UDP 60 source port is an optional field that, when used, indicates a port of the sending process, and may be assumed to be the port to which a reply should be addressed in the absence of any other information. If not used, a value of zero is inserted. A UDP 60 header also has a source address field. A locally unique port can also be used in a UDP 60 header.

In an illustrative embodiment of the present invention, PAP 64 is used to create a combination network address 72 that is used in TCP 58 and/or UDP 60 header fields. In another embodiment of the present invention, the combination network address 72 is stored in other message header fields understood by router 26 (i.e., non-IP 48 TCP 58 or UDP 60 fields), first computer network 12, second computer network 30, and third computer network 32.

In an illustrative embodiment of the present invention, router 26 allocates blocks of locally unique ports to network devices (14, 16, 18, 20, 22, 24). However, other network devices could also be used to allocate locally unique ports (e.g., a port server or the proxy server 24). Router 26 maintains a port-to-internal network address table as locally unique parts are allocated. Router 26 also has an internal table indicating internal network addresses for all network devices (14, 16, 18, 20, 22, 24) on first computer network 12. In an illustrative embodiment of the present invention, the internal network addresses for first computer network 12 are IP 48 addresses. For example, PC 14 has an internal IP address of 10.0.0.5 (FIG. 1), printer 16, 10.0.0.2, PC 18, 10.0.0.3, hand-held computer 20, 10.0.0.4, network phone 22, 10.0.0.5, proxy server 24, 10.0.0.6, and router 26, 10.0.0.7 in FIG. 1. The internal addresses are preferably not published on the external computer network (e.g., the Internet or an intranet). Other internal network addresses could also be used (e.g., Medium Access Control ("MAC") protocol addresses).

FIG. 8 is a block diagram illustrating a port-to-internal address table 118 layout maintained by router 26 (or another device implementing PAP 64). Other layouts and more or fewer rows and columns could also be used. Port-to-internal address table 118 layout has three columns: an internal-network-address column 120, a lowest-port column 122, and a number-of-ports column 124. A second network device has been allocated ports 1057–1072 for use with internal network address 10.0.0.3 (e.g., computer 18). An internal network address may have several entries in port-to-internal address table 118.

Distributed Network Address Translation

Figure 9:
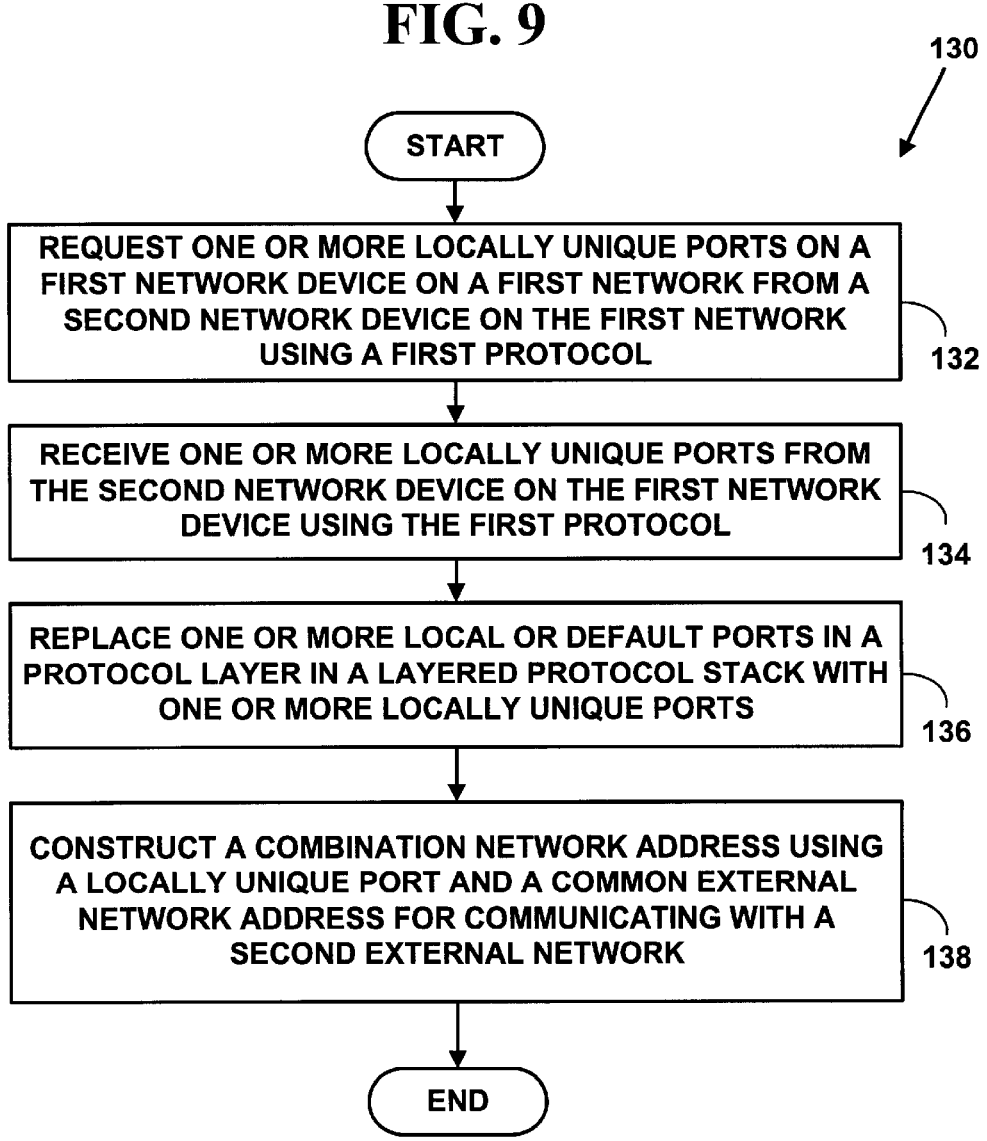
FIG. 9 is a flow diagram illustrating a method for enabling distributed network address translation in a network telephony system, according to an exemplary embodiment of the present invention.

FIG. 9 is a flow diagram illustrating a method 130 for enabling distributed network address translation in a network telephony system, according to an exemplary embodiment of the present invention. At step 132, a first network device (such as network phone 22) on a first computer network uses a first protocol to request one or more locally unique ports from a second network device (such as router 26 or proxy server 24) on the first computer network. The locally unique ports are used to replace default ports in protocol layers in layered protocol stack 42 on the first network device. In addition, the locally unique ports are used to create a combination network address comprising a locally unique port and a common external address to communicate with a second external computer network without address translation. At step 134, the first network device receives the one or more locally unique ports from the second network device. At step 136, the first network device replaces one or more local or default ports used in layered protocol stack 42 with one or more locally unique ports. At step 138, the first network device constructs one or more combination network addresses using the one or more locally unique ports and a common external network address used to identify the first computer network on the second external computer network.

In an illustrative embodiment of the present invention, the first network device is any of network devices (14, 16, 18, 20, 22, 24), the second network device is router 26 or proxy server 24, the first computer network is first computer network 12 (e.g., SOHO LAN), the first protocol is PAP 64, and the second external computer network is any of second computer network 30 (e.g., the Internet or an intranet) or third computer network 32 (e.g., PSTN). The combination network address includes a common IP 48 address (e.g., common network address 28) identifying network devices on first computer network 12 to a second external computer network (e.g., 30 or 32). The present invention is not limited to the networks, network devices, network addresses, or protocols described and others may also be used. In addition, other telephony servers (such as redirect, registrar, or location servers) may be substituted for proxy server 24.

The locally unique ports are used for entities such as protocols and applications in layered protocol stack 42 on a network device (14, 16, 18, 20, 22, 24) and are locally unique on first computer network 12. The locally unique ports will identify a network device on first computer network 12. For example, TCP 58 typically has a default source port assigned to the TCP stack (e.g., 1234). After allocation with method 130, a network device uses a locally unique port to replace a default or local port in a protocol layer in layered protocol stack 42. As is illustrated in FIG. 8, network phone 22 with internal IP 48 address 10.0.0.5 is assigned thirty-two locally unique ports in the range of 1026-1057. Network phone 22 may assign locally unique port "1026" to TCP 58 to use as a source port. The original default port for TCP 58 was 1234. Combination network address 112 illustrated in FIG. 7 is then assigned to TCP 58 on network device 22 for communications with an external network (e.g., 30 or 32). Other locally unique ports are assigned to other protocols and applications in layered protocol stack 42 on a network device to replace other local ports. As was discussed above, ports may also be used with UDP 60, in a similar manner. Many network telephony systems use UDP 60 for communicating voice data between two or more parties.

In one embodiment of the present invention, locally unique ports are assigned to protocol layers in layered protocol stack 42 when a network device boots up. In another embodiment of the present invention, locally unique ports are assigned to protocol layers in layered protocol stack when a protocol layer makes a request for an external network (e.g., 30 or 32). In yet another embodiment of the present invention, locally unique ports are assigned dynamically or "on-the-fly" in an individual protocol layer as a protocol layer makes a request for an external network (e.g., 30 or 32). Other techniques may also be used.

The locally unique ports with common external network address 28 as combination network address 112 uniquely identify a network device to an external network (e.g., 30 or 32). Network interface card device drivers in link layer 44 maintain the actual internal IP 48 address of a network device.

Figure 10:
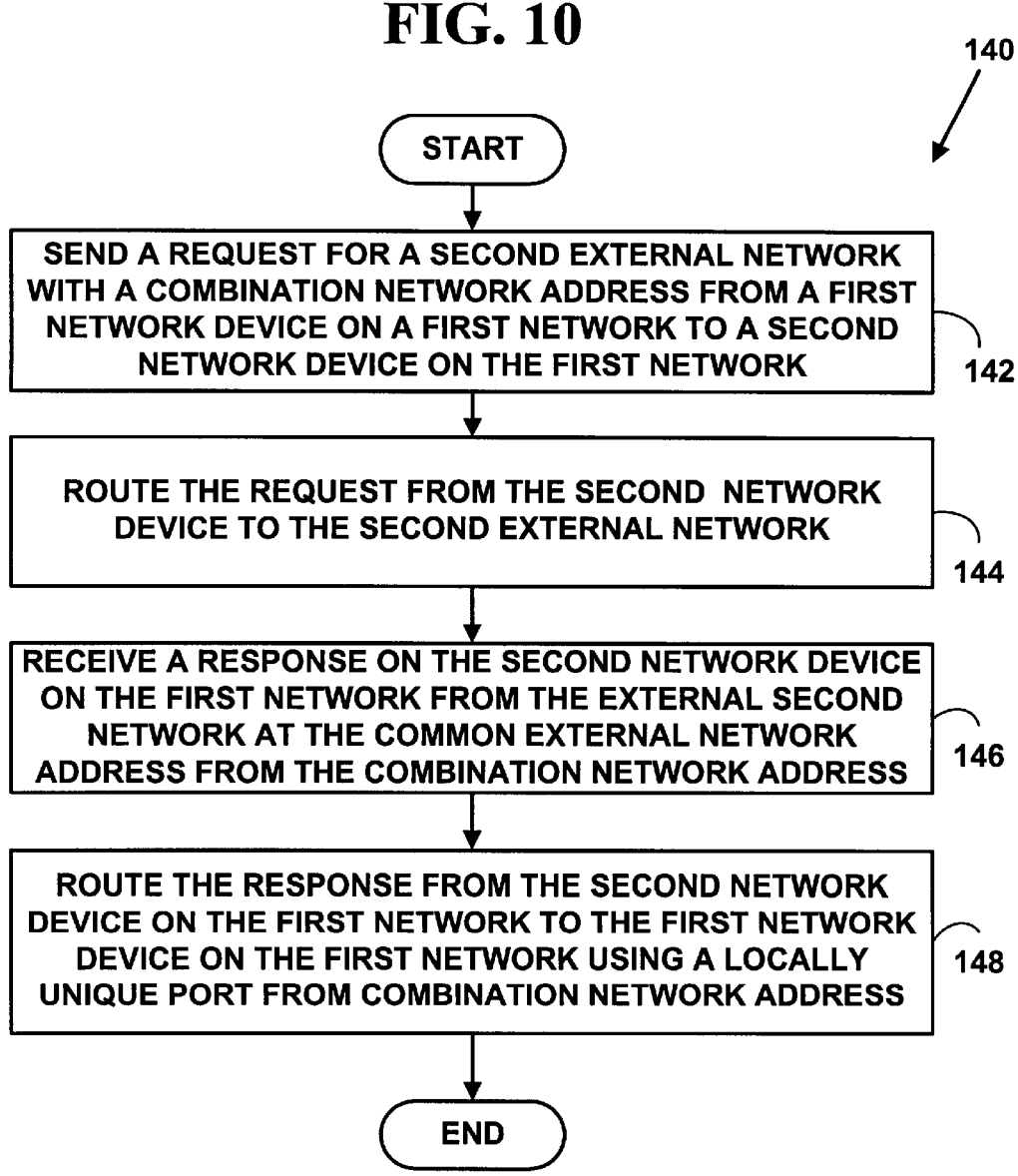
FIG. 10 is a flow diagram illustrating a method for distributed network address translation in a network telephony system, according to an exemplary embodiment of the present invention.

FIG. 10 is a flow diagram illustrating a method 140 for distributed network address translation in a network telephony system, according to an exemplary embodiment of the present invention. At step 142, a request is sent from a first network device on a first computer network to a second network device on the first computer network. The request is for a second external network and includes a combination network address identifying the first network device on the first network. The combination network is constructed with method 130 (FIG. 9) and includes a locally unique port and a common external address to identify the first computer network to the second external network. At step 144, the second network device routes the request from the first computer network to the second external network. At step 146, the second network device on the first computer network receives a response from the external second computer network at the external network address identifying the first network from the combination network address. At step 148, the second network device on the first computer network routes the response to the first network device on the first computer network using the locally unique port from the combination network address.

In an illustrative embodiment of the present invention, the first network device is any of network devices (14, 16, 18, 20, 22, 24), the second network device is router 26 and/or proxy server 24, the first computer network is SOHO LAN 12, and the second computer network is second computer network 30 or third computer network 32. The combination network address includes a locally unique port obtained with PAP 64 and an external IP 48 address for an external network such as the Internet, an intranet, or another computer network. The present invention is not limited to the networks, network devices, network address or protocol described and others may also be used.

Method 140 is illustrated with a specific example using TCP 58/IP 48 layers from layered protocol stack 42. Other protocol layers in layered protocol stack 42 could also be used. At step 142, network phone 22 sends a TCP 58 request to a second network phone 39. For example, the request may be a TCP 58 request (such as a TCP-based SIP Invite request) for second network phone 39 at external IP 48 address 192.200.20.3 on second computer network 30. Table 2 illustrates an exemplary request data packet sent at step 142.

TABLE 2

| IP 48 Header | TCP 58 Header |
|---|---|
| SRC IP: 198.10.20.30 | SRC Port: 1032 |
| DST IP: 192.200.20.3 | DST Port: 80 |

The source IP 48 address is common external network address 28 (e.g., 198.10.20.30) and the source port is locally unique port-1032 obtained via PAP 64 with method 130 and assigned to TCP 58. In one embodiment of the present invention, locally unique port-1032 replaces local port 1234 for TCP 58 when network phone 22 was booted up. In another embodiment of the present invention, local port 1234 is replaced with a locally unique port such as locally unique port-1032 whenever a protocol layer in layered protocol stack makes the request. The locally unique port along with the common external address compose combination network address 112. In the illustrative example, the default TCP 58 port of 1234 has been replaced with locally unique port-1032. The destination IP address is 192.200.20.3 for second network phone 39 (FIG. 1) on second external network 30 and the destination port is well known Internet port 80. When the request reaches a network interface card device driver in link layer 44, in layered protocol stack 42, an outer IP 48 header is added to route the request to router 26. Network interface card device drivers maintain the local internal network address (e.g., 10.0.0. x) for a network device for internal communications. Table 3 illustrates an exemplary data packet with an outer IP 48 header added for router 26.

TABLE 3

| Outer IP 48 header | Inner IP 48 header | TCP 58 header |
|---|---|---|
| SRC IP: 10.0.0.5 | SRC IP: 198.10.20.30 | SRC Port: 1032 |
| DST IP: 10.0.0.7 | DST IP: 192.200.20.3 | SRC Port: 80 |

A network interface card device driver adds the outer IP 48 header including a source IP 48 address for network phone 22 of 10.0.0.5 and a destination IP 48 address of 10.0.0.7 for router 26. At step 144, router 26 receives the request data packet, strips the outer IP 48 header, and sends the request data packet to external network 30.

At step 146, router 26 receives a response packet from an external network (e.g., 30). An exemplary response data packet is illustrated in Table 4.

TABLE 4

| IP 48 Header | TCP 58 Header |
|---|---|
| SRC IP: 192.200.20.3 | SRC Port: 80 |
| DST IP: 198.10.20.30 | DST Port: 1032 |

Router 26 receives the response packet from external second network 30 at step 146 with destination IP 48 address set to common external network address 198.10.20.30 and destination port set to locally unique port-1032. Router 26 uses port-to-internal network address table (FIG. 8) to map destination port-1032 to internal IP 48 address 10.0.0.5 for network phone 22. Router 26 adds an outer IP 48 header to route the response data packet back to network phone 22. Table 5 illustrates an exemplary sponse packet with outer IP 48 header added by router 26.

TABLE 5

| Outer IP 48 header | Inner IP 48 header | TCP 58 header |
|---|---|---|
| SRC IP: 10.0.0.7 | SRC IP: 192.200.20.3 | SRC Port: 80 |
| DST IP: 10.0.05 | DST IP: 198.10.20.30 | SRC Port: 1032 |

Outer IP 48 header has a source internal IP 48 address of 10.0.0.7 for router 26 and a destination internal IP 48 address of 10.0.0.5 for network phone 22 on computer network 12. At step 148, router 26 routes the response data packet to network phone 22 with the outer IP 48 header. A network interface card device driver in link layer 44 in layered protocol stack 42 strips the outer IP 48 header and forwards the response data packet to network layer 46.

Network phone 22 sends a request to an external network and receives a response from the external network using DNAT and a locally unique port allocated with PAP 64. Router 26 does not translate any source/destination IP 48 addresses or source/destination ports. Thus, DNAT is accomplished without network address translation at router 26.

An illustrative embodiment of the present invention is described with respect to a single common external network address identifying multiple network devices on first computer network 12 and used in combination network address 112 with a locally unique port. However, the present invention is not limited to a single common external network address and can also be practiced with multiple common external network addresses as long as the number of multiple common external network addresses remains a reasonably small number (e.g., preferably less than ten).

Distributed network address translation using method 130 (FIG. 9) and method 132 (FIG. 10) eases the computational burden of network address translation at router 26 and allows multiple network devices to use a single or a small number of external network addresses known to an external network such as the Internet or an intranet. Instead of providing network address translation, router 26 routes data packets from a network device (14, 16, 18, 20, 22, 24) on first computer network 12 to a second external computer network such as second computer network 30 or third computer network 32 using the combination network address. In addition, router 26 is no longer required to support multiple application protocols from layered protocol stack 42. This assists in avoiding call quality problems due to delays caused by excessive processing at router 26.

Router 26 also routes data packets from the second external computer network back to a network device on the first computer network using the locally unique port in the combination network address. Router 26 is no longer required to replace an internal network address with an external network address for outbound traffic, and replace an external network address with an internal network address for inbound traffic. Thus, DNAT according to the present invention eases the computational burden of network address translation from router 26 and does not violate the Internet principal of providing end-to-end transmission of data packets between network devices without alterations. This is particularly beneficial to SIP-based network telephony systems because it enables encrypted conversations and/or other exchanges of data between users of the network telephony system.

DNAT with Port Translation

In another embodiment of the present invention, DNAT is accomplished without substantially modifying protocols or applications in layered protocol stack 42 above link layer 44. However, in such an embodiment, a link layer 44 in network devices (14, 16, 18, 20, 22, 24) is used to translate default or local ports "on-the-fly" to/from locally unique ports reserved by a network device with PAP 64. In addition, link layer 44 supports multiple protocols from layered protocol stack 42 above link layer 44 for DNAT with port translation.

As an example, suppose network phone 22 (FIG. 1) with internal IP 48 address 10.0.0.5 makes a TCP 58/IP 48 request from a network device on second computer network 30 (e.g., the Internet) at external IP 48 address 192.200.20.3 (i.e., second network phone 39, FIG. 1). The initial TCP 58 packet reaching network interface card device driver in link layer 44 of layered protocol stack 42 is illustrated in Table 6.

TABLE 6

| IP 48 Header | TCP 58 Header |
|---|---|
| SRC IP 198.10.20.30 | SRC Port: 1234 |
| DST IP 192.200.20.3 | DST Port: 80 |

The local source port for TCP 58 is 1234, the destination port is well known port 80 for the Internet, the source IP 48 address is common external network address 28 and the destination address is external IP 48 address for second network phone 39 (FIG. 1).

In the illustrative embodiment discussed above using methods 130 and 140 of FIGS. 9 and 10, application and/or protocol local default ports are modified by a network device to use a locally unique port obtained via PAP 64 in protocol layers above link layer 44. However, for DNAT with port translation, ports in protocol layers above link layer 44 in layered protocol stack 42 are not modified. Network interface card device drivers in link layer 44 instead provide port and address translation. In such an embodiment, a network interface card device driver will determine that a connection is being initiated. An entry in a Source Port Translation Table ("SPTT") in a network interface card device driver is created.

FIG. 11 illustrates a SPTT layout 150 for use in a network telephony system, according to an exemplary embodiment of the present invention. Other layouts, field sizes, and values could also be used. Local-port field 152 is two-bytes and is the port number used by TCP 58 of a network device. Global-port 154 field is two-bytes and is a locally unique port number used for external communications allocated by PAP 64. Protocol-field 156 is one-byte and has a value of zero for TCP 58 and a value of one for UDP 60. Timestamp-field 158 is four-bytes and has a value of a current system time in milliseconds updated every time the current entry is used.

TCP 58 source port 1234 is translated into a locally unique port allocated by PAP 64 by a network interface card device driver in link layer 44. TCP 58 source port 1234 is not translated in TCP 58 layer or any other protocol layer above the link layer in layered protocol stack 42. An entry is added to SPTT 150. Table 7 illustrates an exemplary SPTT 150 table entry.

TABLE 7

| Local Port | Locally Unique Port | Protocol | Timestamp |
|---|---|---|---|
| 1234 | 1030 | 1 (TCP) | 10023 |

After translation by the network interface card driver, an outer IP 48 header is added to the data packet. The outer IP header is used for routing. The outer IP header has the internal address of the network device as a source IP 48 address (e.g., 10.0.0.5) and the internal network address of router 26 (e.g., 10.0.0.7) as a destination address. Table 8 illustrates the data packet with the outer IP 48 header.

TABLE 8

| Outer IP 48 Header | Inner IP 48 Header | TCP 58 Header |
|---|---|---|
| SRC IP 10.0.0.1 | SRC IP 198.10.20.30 | SRC port 1032 |
| DST IP 10.0.0.7 | DST IP 192.200.20.3 | DST port 80 |

Upon receiving the data packet illustrated in Table 4, router 26 examines the source port (e.g., 1032) and the outer IP 48 source address (e.g., 10.0.0.5) to ensure a network device is using a valid locally unique port assigned to the network device.

Router 26 maintains an IP Address Translation Table ("IPATT"). FIG. 12 illustrates an IPATT layout 160 for use in a network telephony system, according to an exemplary embodiment of the present invention. Other layouts, field sizes, and values could also be used. Destination port-field 162 is two-bytes and holds a locally unique port obtained with PAP 64. Internal destination IP address-field 164 is four-bytes and is the internal IP 48 address (e.g., 10.0.0.5) of a network device using the locally unique port in destination port-field 162. Protocol-field 166 is one-byte and has a value of zero for TCP 58 or a value of one for UDP 60. Timestamp-field 168 is four-bytes and has a value of a current system time in milliseconds updated every time this entry is used. Table 9 illustrates an exemplary IPATT 160 table entry.

TABLE 9

| Destination Port (locally unique port) | Internal Destination IP 48 Address | Protocol | Timestamp |
|---|---|---|---|
| 1032 | 10.0.0.5 | 1 (TCP) | 10048 |

Table 9 illustrates that locally unique port-1032 is associated with internal IP 48 address 10.0.0.5 (e.g., network phone 22) for TCP 58 protocol.

Router 26 strips off the outer IP 48 header illustrated in Table 4 and sends the data packet comprising the inner IP 48 header and TCP 58 header to external network 30.

A response data packet arrives from an external network on common external network address 28 (e.g., 198.10.20.30). An arriving packet contains the headers illustrated in Table 10.

TABLE 10

| IP 48 Header | TCP 58 Header |
| --- | --- |
| SRC IP 192.200.20.3 | SRC Port: 80 |
| DST IP 198.10.20.30 | DST Port: 1032 |

Router 26 looks up destination port 1032 (i.e., locally unique port 1032) in IPATT 158 (Table 9) and finds local network address 10.0.0.5 (e.g., network phone 22). Router 26 then creates an outer IP 48 header such as the exemplary IP 48 header illustrated in Table 11. The outer IP 48 header has a source IP 48 address for router 26 and a destination IP 48 address for network phone 22.

TABLE 11

| Outer IP 48 Header | Inner IP 48 Header | TCP 58 Header |
| --- | --- | --- |
| SRC IP 10.0.0.7 | SRC IP 192.200.20.3 | SRC port 80 |
| DST IP 10.0.0.5 | DST IP 198.10.20.30 | DST port 1032 |

Router 26 then transmits the data packet illustrated in Table 11 to the appropriate network device (e.g., network phone 22 at internal address 10.0.0.5). Upon receiving the data packet, a network interface card driver looks up the destination port (e.g., 1032) in SPTT 148 (e.g., Table 7), finding a mapping to TCP 58 port 1234. Locally unique port-1032 is re-translated back to default TCP 58 local port 1234 in link layer 44. No translation is done above link layer 44. Outer IP 48 header is then stripped. The data packet is forwarded to IP 48 in network layer 46. Table 12 illustrates the forwarded data packet.

TABLE 12

| Inner IP 48 header | TCP 58 header |
| --- | --- |
| SRC IP 192.200.20.3 | SRC Port 80 |
| DST IP 198.10.20.30 | DST Port 1234 |

The end of the connection is detected by both router 26 and network device 22. Upon detecting the end of the connection, the entries in the SPTT 148 and IPATT 160 tables are removed from router 26 and the network interface card driver.

Figure 13:
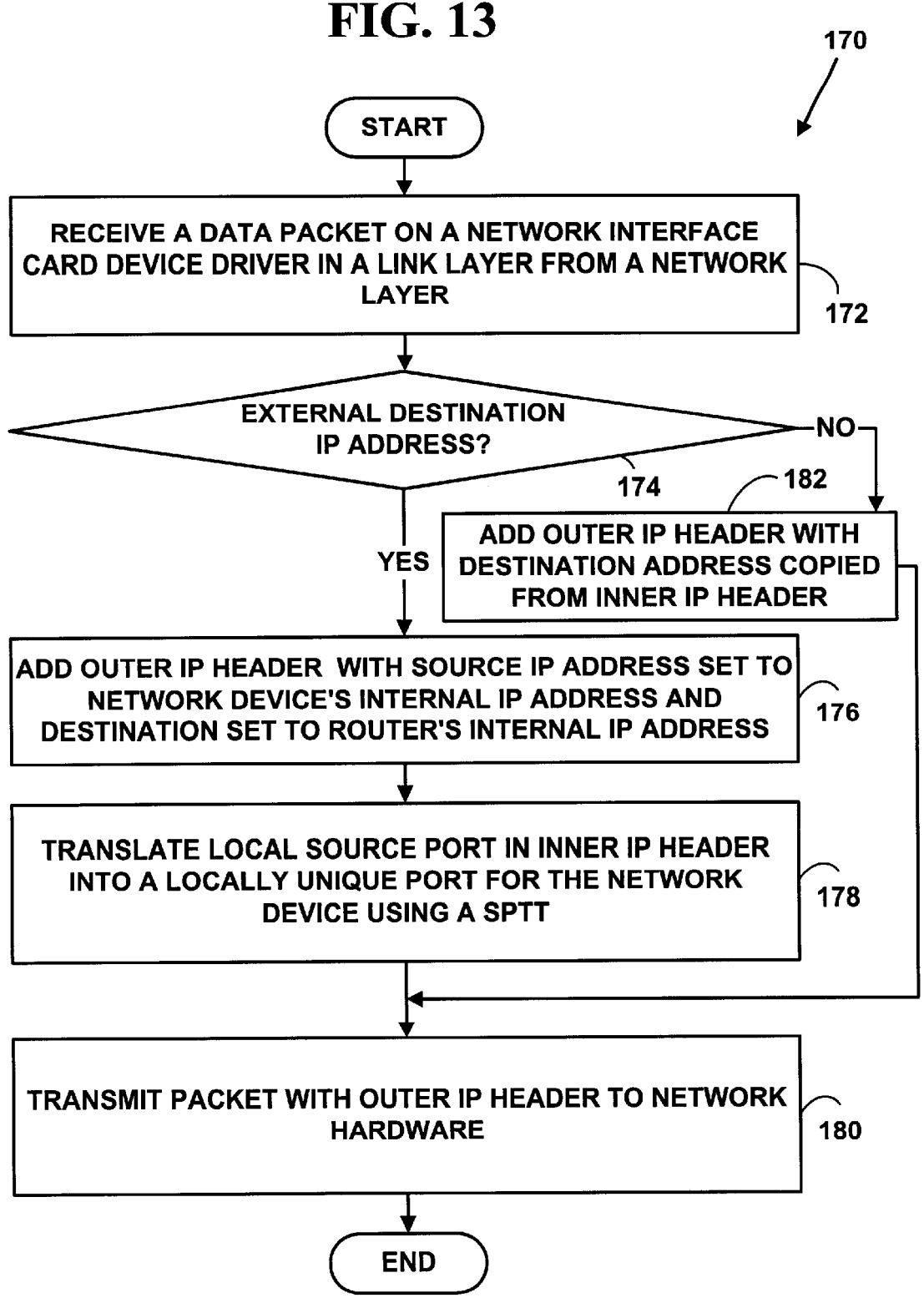
FIG. 13 illustrates a method for outbound distributed network address translation using port translation, for use in a network telephony system, according to an exemplary embodiment of the present invention.

FIG. 13 is a flow diagram illustrating a method 170 for outbound distributed network address translation using port translation, for use in a network telephony system, according to an exemplary embodiment of the present invention. At step 172, a network interface card device driver in link layer 44 receives a data packet from network layer 46 packet (e.g., Table 6). At step 174, the network interface card device driver determines whether a destination network address (e.g., 192.200.20.3) is for an external network (e.g., 30 or 32). If so, at step 176, the network interface card device driver adds an outer IP 48 header to the data packet with the source address set to the network device's internal IP 48 address (e.g., 10.0.0.5) and the destination address set to the router 26 internal address (e.g., 10.0.0.7). At step 178, a local source port for the application or protocol from the header (e.g., TCP 58 port 1234) is translated into a locally unique port (e.g., 1032) obtained via PAP 64 with SPTT 150 (e.g., Table 7). At step 180, the data packet with the outer IP 48 header is transmitted to network interface card hardware, which forwards the data packet to router 26.

If it is determined at step 174 that the destination network address is for internal network 12, then at step 182, an outer IP 48 header is added to the data packet with the destination address in the outer IP 48 header copied from the inner IP 48 destination address. The data packet with the outer IP 48 header is transmitted to network interface card hardware, which forwards the data packet to router 26 at step 180. The local or default source port is preferably not translated to a locally unique port for internal communications.

Using method 170, distributed network address translation is done by a network interface card device driver, and no port translation occurs above link layer 44. Other software, firmware and/or hardware modules or drivers in link layer 44 besides a network interface card device driver could also be used to translate ports with method 170.

FIG. 14 is a flow diagram illustrating a method 184 for inbound distributed network address translation using port translation, for use in a network telephony system, according to an exemplary embodiment of the present invention. At step 186, a data packet is received on a network interface card driver in link layer 44 (e.g., Table 11) from router 26. Router 26 received the data packet from external network 30 or 32 and added an outer IP 48 header. At step 188, a test is conducted to determine if the source IP 48 address from the inner IP 48 header is an external IP 48 address. If so, at step 190 the destination port from the inner IP 48 header is translated from a locally unique port to a local port (e.g., 1032→1234) using SPATT 158 (Table 7). At step 192, the outer IP 48 header is stripped off. At step 192, the data packet (e.g., Table 12) is forwarded to network layer 46.

If it is determined that the source IP 48 address is for internal network 12, then at step 196 the source IP address from the outer IP 48 header is copied to the inner source IP address. At step 192, the outer IP 48 header is stripped off. At step 194, the data packet is forwarded to network layer 46. The default or local source port is preferably not translated to a locally unique port for internal communications.

Using method 184, distributed network address translation is done by a network interface card device driver, and no port translation occurs above link layer 44. Other software or hardware modules or drivers in link layer 44 besides a network interface card device driver could also translate ports with method 184.

DNAT (FIG. 9 & FIG. 10) does port translation in individual protocol layers in layered protocol stack 42. The port translation may be done at boot up time for a network device, or dynamically in a protocol layer when a protocol layer makes a request to an external network (e.g., 30 or 32).

In contrast, DNAT with port translation (FIG. 13 & FIG. 14) does port translation in link layer 44 on a network device. No ports are translated in protocol layers above link layer 44. In addition, link layer 44 supports multiple protocols from layered protocol stack 42 above link layer 44 for DNAT with port translation. For outbound data, a local port assigned to an application or protocol is translated to a locally unique port on-the-fly in link layer 44. For inbound data, the network device translates a locally unique port back to a local port on-the-fly in link layer 44. DNAT with on-the-fly port translation in link layer 44 (FIGS. 13 & 14) may place more computational overhead on a network device than DNAT with port translation in individual protocol layers (FIG. 10).

Both DNAT with port translation in individual protocol layers and DNAT with on-the-fly port translation in link layer 44 (FIGS. 13 & 14) are preferred over non-distributed network address translation in router 26 with methods known in the prior art since computational costs for translation are distributed among a number of network devices and not concentrated in router 26. As a result, the likelihood of degradation of voice transmission quality is lessened. Another advantage of using DNAT in a network telephony system is that conversations and/or other exchanges of data may be encrypted between two or more parties.

Implementing DNAT in a SIP-based Telephony System

As was described above with reference to FIG. 1, DNAT may be implemented according to RSIP, described in Borella et al., "Realm Specific IP: Protocol Specification," <draft-ietf-nat-rsip-protocol-07.txt>, July 2000, and in Borella et al., "Realm Specific IP: Framework," <draft-ietf-nat-rsip-framework-05.txt>, both of which may be accessed at the IETF web site (www.ietf.org). RSIP allows an RSIP host (such as a network device on LAN 12) to establish registration with an RSIP gateway, such as the router 26. The RSIP host may, for example, register with the RSIP gateway and request a specific locally unique port.

In a first exemplary embodiment, the proxy server 24 may function as an RSIP host, and the router 26 may function as an RSIP gateway. The proxy server 24 registers with the router 26 to obtain a specified port. The specified port is a locally unique port, and is preferably a well-known port, such as Port 5060, the well-known port for the Session Initiation Protocol (SIP). The combination address assigned to the proxy server 24 includes the common external address 28 and the locally unique port, which is Port 5060 in this case. Then, all incoming calls addressed to the combination address go through the router 26 to the proxy server 24. Because SIP-based network phones will typically use port 5060 for SIP calls (because Port 5060 is the well-known port for SIP), incoming calls are likely to be addressed to the combination address of the proxy server 24. Upon registering with the router 26, the proxy server may receive an incoming request from an external network phone located on an external network. The request includes the common external address 28 and the specified port (Port 5060). The proxy server 24 may then proxy the incoming call to the appropriate network phone, such as the network phone 22, using the call signaling protocol (e.g. SIP). In this embodiment, each network phone also may obtain a locally unique port, and may provide a combination address to the proxy server 24 to enable the mapping of incoming calls. Other addressing schemes may also be used. Network phones on LAN 12, such as network phone 22, preferably also utilize the proxy server 24 when initiating outgoing calls. In addition, although this embodiment has been described in terms of RSIP, other implementations of DNAT may be used. Similarly, other call signaling protocols (besides SIP) and specific ports may be used.

In alternate embodiment, the proxy server 24 functions as a redirect server. When a network phone, such as the network phone 22, boots up, it obtains a locally unique port. The network phone then has a combination address composed of the common external network address 28 and the locally unique port. The network phone registers with a registration server, which may, for example, be co-located with a proxy server or redirect server. For exemplary purposes, it will be assumed that the proxy server 24 includes a registration server and a redirect server. Then, when a remote network phone, such as the network phone 39, initiates a call to proxy server 24 (by sending an invite request, in order to reach a network phone on the LAN 12), the proxy server 24 sends a SIP redirect message to the remote network phone, notifying the network phone of the external common address and the port of the network phone being called. In this embodiment, no network phones on LAN 12 are allowed to use port 5060, the well-known port for SIP. Although this embodiment has been described in terms of RSIP, other implementations of DNAT may be used. Similarly, other call signaling protocols (besides SIP) and specific ports may be used.

The various embodiments of the present invention described above offer several advantages over the prior art. Network address translation and the large computational burden is removed from a router and distributed to individual network devices using a port allocation protocol to allocate locally unique ports. A router is no longer required to support multiple individual protocols. DNAT port translation is done on a source and/or destination network device. Thus, DNAT with port translation does not violate the Internet principle recommending that packets flow end-to-end between network devices without changing the contents of any packet along a transmission route. Illustrative embodiments of the present invention can support multicasting with a router serving as a proxy for internal network devices that wish to join an existing multicast session.

Illustrative embodiments of the present invention can also be used to support Virtual Private Networks ("VPNs").

DNAT also allows a local network to efficiently switch between external network service providers (e.g., Internet service providers) by changing the common external address for an external network assigned to a local network. DNAT also allows a local network to purchase a smaller block of external network addresses, providing cost savings on the local network.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

Preferred and alternative embodiments of the present invention have been illustrated and described. It will be understood, however, that changes and modifications may be made to the invention without deviating from its true spirit and scope, as defined by the following claims.

We claim:

1. A method for distributed network address translation on a network telephony system, comprising in combination:

requesting at a first network phone with a first protocol, at least one locally unique port from a first network device, wherein the first network phone and the first network device are located on a first network;

receiving at the first network phone with the first protocol, the at least one locally unique port from the first network device;

replacing at least one default or ephemeral port on the first network phone with the at least one locally unique port; and creating a combination network address for the first network phone with the at least one locally unique port and a common external network address, thereby identifying the first network phone for communications with a second network device located on a second network.

2. A computer readable medium having stored therein instructions for causing a central processing unit to execute the method of claim 1.

3. The method of claim 1, wherein the first protocol is a Port Allocation Protocol (PAP) comprising:
   a PAP request message;
   a PAP response message;
   a PAP invalidate message; and
   at least one PAP combination network address including at least one PAP locally unique port and at least one PAP external network address for the first network.

4. The method of claim 1, wherein the common external network address is an Internet Protocol address and the at least one locally unique port is a Port Allocation Protocol port.

5. The method of claim 1, wherein the at least one locally unique port allows distributed network address translation to be used on the first network phone.

6. The method of claim 1, wherein the at least one default or ephemeral port is selected from the group consisting of a Transmission Control Protocol port and a User Datagram Protocol port.

7. The method of claim 1, wherein the first network device is selected from the group consisting of a router, a port server, and a proxy server.

8. The method of claim 1, wherein the second network device is selected from the group consisting of a second network phone and a proxy server.

9. The method of claim 1, wherein the method further comprises:
   registering a specified port to a proxy server on the first network;
   receiving at the proxy server a request from the second network device; and
   mapping the request from the proxy server to the first network phone.

10. The method of claim 9, wherein the first network operates according to the SIP signaling protocol, wherein the first network phone is a SIP network phone, wherein the proxy server is a SIP proxy server, and wherein the specified port is Port 5060.

11. The method of claim 1, wherein the method further comprises:
    receiving at a redirect server a request from the second network device; and
    sending a redirect message from the redirect server to the second network device, wherein the redirect message includes the combination network address for the first network phone.

12. The method of claim 11, wherein the first network operates according to the SIP signaling protocol, wherein the first network phone is a SIP network phone, and wherein the redirect server is a SIP redirect server.

13. The method of claim 1, further comprising:
    sending a request from the first network phone to the first network device on the first network, wherein the request is routed from the first network device to the second network;
    receiving a response from the first network device at the first network phone, wherein the response is routed from the first network device to the first network phone using the at least one locally unique port from the combination network address.

14. The method of claim 1, wherein the first network is a local area network and the second network is selected from the group consisting of a public internet, the Internet, an intranet, or a public switched telephone network.

15. The method of claim 1, wherein the second network device is a second network phone, further comprising initiating an encrypted network telephony call between the first network phone and the second network phone, using the combination network address.

16. A method for distributed network address translation on a network telephony system, comprising in combination:
    requesting at a first network phone with a first protocol, at least one locally unique port from a first network device, wherein the first network phone and the first network device are located on a first network;
    receiving at the first network phone with the first protocol, the at least one locally unique port from the first network device;
    creating a request in a higher level protocol layer in a layered protocol stack on the first network phone, for a second network device on a second network, wherein the request includes a common external network address and a local port on the first network phone;
    forwarding the request from the higher level protocol layer to a lower level protocol layer in the first network phone;
    translating the local port in the request to a locally unique port in the lower level protocol layer on the first network phone;
    sending the request from the first network phone to a third network device on the first network; and
    forwarding the request from the third network device to the second network device.

17. The method of claim 16, further comprising:
    receiving a response on the third network device on the common external network address for the first network phone from the second network device, wherein the response includes the common external network address and the locally unique port for the first network phone;
    sending the response from the third network device to the first network phone;
    translating the locally unique port in the response to the local port for the first network phone in the lower level protocol layer on the first network phone; and
    forwarding the response to the higher level protocol layer on the first network phone.

18. A computer readable medium having stored therein instructions for causing a central processing unit to execute the method of claim 17.

19. The method of claim 16, wherein the first protocol is a Port Allocation Protocol (PAP) comprising:
    a PAP request message;
    a PAP response message;
    a PAP invalidate message; and
    at least one PAP combination network address including at least one PAP locally unique port and at least one PAP external network address for the first network.

20. The method of claim 16, wherein the third network device is included within the first network device.

21. The method of claim 16, wherein the first network device is a router on the first network.

22. The method of claim 16, wherein the common external network address is an Internet Protocol address and the locally unique port is a Port Allocation Protocol port.

23. The method of claim 16, wherein the locally unique port allows distributed network address translation to be used on the first network phone.

24. The method of claim 16, wherein the local port is selected from the group consisting of a Transmission Control Protocol port and a User Datagram Protocol port.

25. The method of claim 16, wherein the first network device is selected from the group consisting of a router, a port server, a proxy server, and a redirect server.

26. The method of claim 16, wherein the second network device is selected from the group consisting of a second network phone and a proxy server.

27. The method of claim 16, wherein the first network is a local area network and the second network is selected from the group consisting of a public internet, the Internet, an intranet, or a public switched telephone network.

28. The method of claim 16, wherein the second network device is a second network phone, further comprising initiating an encrypted network telephony call between the first network phone and the second network phone, using the common external network address and the locally unique port.

29. A method for distributed network address translation in a network telephony system, comprising in combination:

registering a proxy server with a router to register a specified port to the proxy server, wherein the proxy server and the router are located on a first network having at least one common external network address, and wherein the proxy server is operable to access at least one network address corresponding to at least one network phone on the first network;

receiving at the proxy server at least one request from an external network phone located on an external network, wherein the request includes the at least one common external network address and the specified port; and proxying the at least one request to the at least one network phone on the first network.

30. The method of claim 29, wherein the network telephony system operates according to the SIP signaling protocol, wherein the proxy server is a SIP proxy server, wherein the router is a DNAT router, wherein one or more of the at least one network phone is a SIP network phone, wherein the request is a SIP Invite request, and wherein the specified port is a well-known port.

31. The method of claim 1, wherein the well-known port is Port 5060.

32. A method for distributed network address translation in a network telephony system, comprising in combination:

obtaining at least one locally unique port respectively for at least one network phone on a first network, wherein at least one common external network address is associated with the first network;

registering the at least one network phone with a registration server;

receiving at a redirect server at least one request from an external network phone located on an external network, wherein the redirect server is registered to a specified port, wherein the request includes the at least one common external network address and the specified port; and sending a redirect message from the redirect server to the external network phone.

33. The method of claim 32, wherein the network telephony system operates according to the SIP signaling protocol, wherein the registration server is a SIP registrar, wherein the redirect server is a SIP redirect server, wherein the router is a DNAT router, wherein one or more of the at least one network phone is a SIP network phone, wherein the request is a SIP Invite request, and wherein the specified port is a well-known port.

34. The method of claim 33, wherein the well-known port is Port 5060.

35. A system for distributed network address translation in a network telephony system, comprising in combination:

a first network phone on a first network, with a combination network address from a Port Allocation Protocol, wherein the combination network address allows distributed network address translation and includes a locally unique port on the first network and a common external network address for the first network, wherein the first network phone is operable to transmit a request, and wherein the request includes the combination network address; and a second network phone on a second network, operable to receive the request and to transmit a response to the first network phone, wherein the response includes the combination network address.

36. The system of claim 35, wherein the first protocol is a Port Allocation Protocol (PAP) comprising:

a PAP request message;

a PAP response message;

a PAP invalidate message; and at least one PAP combination network address including at least one PAP locally unique port and at least one PAP external network address for the first network.

37. The system of claim 35, wherein the common external network address is an Internet Protocol address and the locally unique port is a Port Allocation Protocol port.

38. The system of claim 35, wherein the locally unique port allows distributed network address translation to be used on the first network phone.

39. The system of claim 35, wherein the local port is selected from the group consisting of a Transmission Control Protocol port and a User Datagram Protocol port.

40. The system of claim 35, wherein the first network is a local area network and the second network is selected from the group consisting of a public internet, the Internet, an intranet, or a public switched telephone network.

41. The system of claim 35, wherein the request and the response are used to initiate an encrypted network telephony call between the first network phone and the second network phone, using the common external network address and the locally unique port.

* * * * *